(12) United States Patent
Strickland

(10) Patent No.: US 12,079,250 B2
(45) Date of Patent: Sep. 3, 2024

(54) EFFICIENT EVALUATION OF SETS OF RESOURCES

(71) Applicant: Tubular Labs, Inc., Mountain View, CA (US)

(72) Inventor: Scott Strickland, Redwood City, CA (US)

(73) Assignee: Tubular Labs, Inc., Mountain View, CA (US)

( * ) Notice: Subject to any disclaimer, the term of this patent is extended or adjusted under 35 U.S.C. 154(b) by 0 days.

(21) Appl. No.: 17/723,018

(22) Filed: Apr. 18, 2022

(65) Prior Publication Data

US 2023/0334067 A1  Oct. 19, 2023

(51) Int. Cl.
| | | |
|---|---|---|
| *G06F 16/28* | (2019.01) | |
| *G06F 16/2453* | (2019.01) | |
| *G06F 18/22* | (2023.01) | |
| *G06F 21/62* | (2013.01) | |
| *G06F 21/64* | (2013.01) | |

(52) U.S. Cl.
CPC ...... *G06F 16/288* (2019.01); *G06F 16/24544* (2019.01); *G06F 18/22* (2023.01); *G06F 21/6245* (2013.01); *G06F 21/64* (2013.01)

(58) Field of Classification Search
CPC ............ G06F 16/288; G06F 16/24544; G06F 18/22; G06F 21/6245; G06F 21/64
See application file for complete search history.

(56) References Cited

U.S. PATENT DOCUMENTS

| | | | | |
|---|---|---|---|---|
| 2017/0300528 A1* | 10/2017 | Qin | ..................... | G06F 16/2453 |
| 2022/0318147 A1* | 10/2022 | Anand | ..................... | G06F 16/21 |
| 2022/0342848 A1* | 10/2022 | Singh | ..................... | G06F 16/188 |

OTHER PUBLICATIONS

Heule et al., "Hyperloglog in practice: Algorithmic engineering of a state of the art cardinality estimation algorithm." Proceedings of the 16th International Conference on Extending Database Technology. 2013.
Qin et al., "LogLog-beta and more: a new algorithm for cardinality estimation based on LogLog counting." arXiv preprint arXiv:1612.02284 (2016).
Yu et al., "Hyperminhash: Minhash in loglog space." IEEE Transactions on Knowledge and Data Engineering 34.1 (2020): 328-339.

* cited by examiner

*Primary Examiner* — Mark D Featherstone
*Assistant Examiner* — Samuel C Sharpless, III
(74) *Attorney, Agent, or Firm* — Van Pelt, Yi & James LLP

(57) ABSTRACT

Efficient evaluation of sets of resources is disclosed, including: determining a first plurality of representations from identifying information associated with a first set of resources; updating a first data structure corresponding to the first set of resources using portions of respective ones of the first plurality of representations; determining a second plurality of representations from identifying information associated with a second set of resources; updating a second data structure corresponding to the second set of resources using portions of respective ones of the second plurality of representations; and using the first data structure and the second data structure to compute a derived value associated with the first set of resources and the second set of resources.

20 Claims, 15 Drawing Sheets

EFFICIENT EVALUATION OF SETS OF RESOURCES

BACKGROUND OF THE INVENTION

Conventionally, users in a set could be represented by their user identifiers or hashes of their user identifiers. From there, user identifiers or hashes of user identifiers can be used to perform calculations such as the number of unique users in a set. However, a user identifier or a hash thereof can still uniquely be traced back to the corresponding user, which undesirably exposes the user to potential privacy risks, as such, for example, having his or her activities monitored. Therefore, it would be desirable to maintain representations of users or resources for the purpose of counting unique instances in a manner that does not infringe the privacy of such users or resources.

BRIEF DESCRIPTION OF THE DRAWINGS

Various embodiments of the invention are disclosed in the following detailed description and the accompanying drawings.

DETAILED DESCRIPTION

Figure 1:
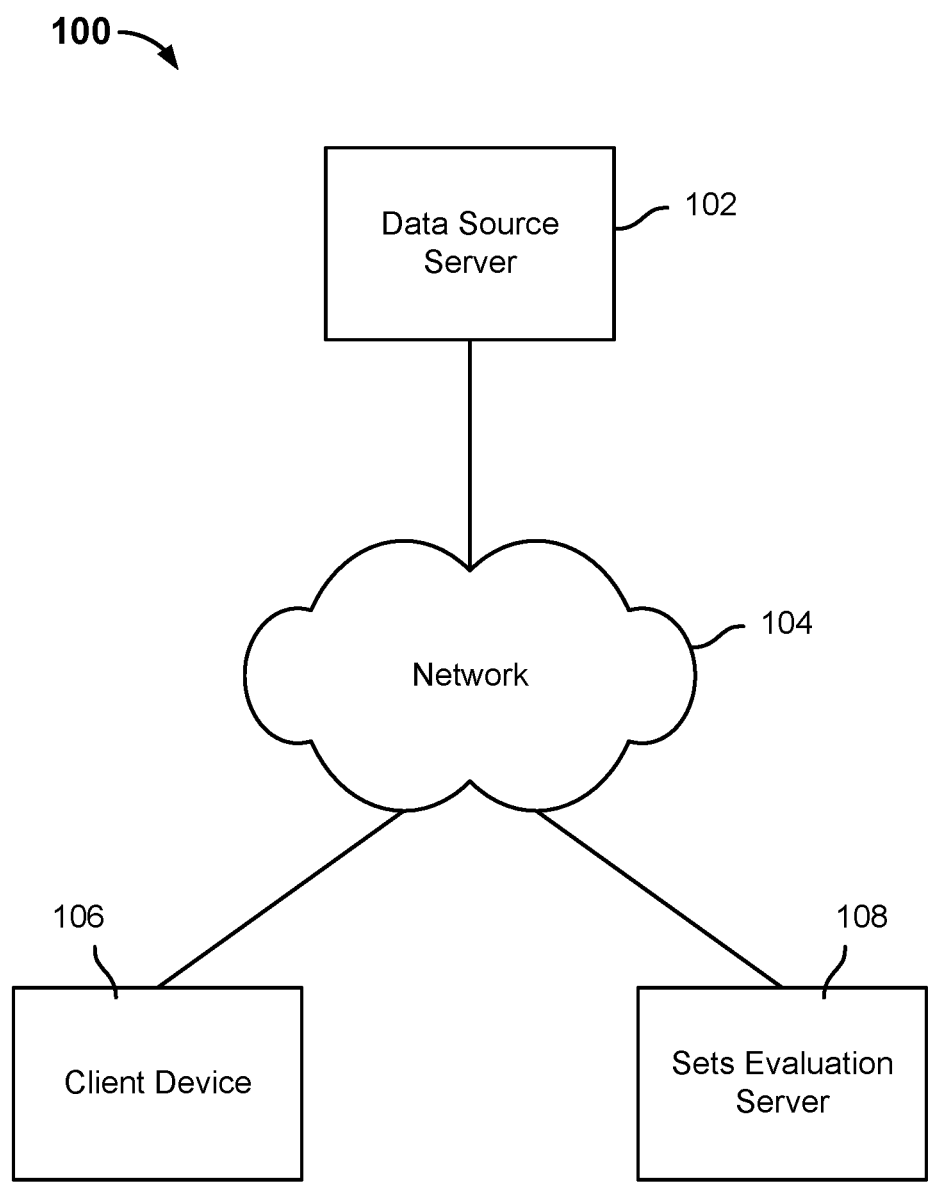
FIG. 1 is a diagram showing an embodiment of a system for efficient evaluation of sets of resources.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of efficient evaluation of sets of resources are described herein. A first plurality of representations is determined from identifying information associated with a first set of resources. For example, the set of resources can be users, internet protocol (IP) addresses, or audience members. In some embodiments, "identifying information" associated with a resource can be a unique identifier (ID). In some embodiments, determining a representation from identifying information associated with a resource includes obtaining a hash based on the resource's ID. A first data structure corresponding to the first set of resources is updated using portions of respective ones of the first plurality of representations. In some embodiments, the first data structure comprises an array with $2^P$ cells ("cells" are also sometimes referred to as "buckets"), where P is a user configurable value that is greater than 1. As will be described in further detail below, the representations (e.g., hashes) of the first set of resources are mapped to respective buckets of the $2^P$ data structure (e.g., array) and portions of the hashes are selectively stored in those buckets. In various embodiments, the updated $2^P$ data structure (e.g., array) becomes a lightweight representation of the first set of resources and that can be stored in lieu of the identifying information of the first set of resources, which comprises a larger data set than the $2^P$ array corresponding to that first set of resources. An updated second data structure (e.g., $2^P$ array) can be similarly obtained corresponding to a second set of resources. The updated $2^P$ data structure (e.g., array) corresponding to the second set of resources becomes a lightweight representation of that second set of resources and that can be stored in lieu of the identifying information of the second set of resources, which comprises a larger data set than the $2^P$ array corresponding to that second set of resources. The first data structure and the second data structure can be used to compute a derived value associated with the first set of resources and the second set of resources. For example, the "derived value" can be an estimated union cardinality (e.g., the number of unique resources) across the first and second set of resources or an estimated intersection cardinality (e.g., the number of unique resources) between the first and second sets of resources.

The computation cost and time associated with generating a derived value associated with the first set of resources and the second set of resources is a function of P. Each reduction of the value of P by 1 reduces the buckets by half and increases error and each increase of the value of P by 1 doubles the bucket count and also decreases the error. For example, P can be less than 10 or greater than 18. In a specific example, P=14. As such, the selection of P, which is a tunable parameter, provides a tradeoff between a more accurate computation of the derived value associated with the sets of resources (using a larger P value) and a faster (e.g., less computationally expensive) computation (using a smaller P value). As will be described in further detail, to enable a faster and more efficient computation of a derived value associated with the multiple sets of resources (e.g., for processing a real-time query), in a process that is sometimes referred to as "down conversion," the P value can be reduced (e.g., based on a user input) and the buckets from each previously generated $2^P$ array can be correspondingly merged together to form new, reduced arrays. The new, reduced arrays corresponding to their respective sets of resources can continue to represent those sets of resources in computations of derived values associated with the sets with a minimal loss of information. As will be described in further detail, while reduced arrays can be generated based on a down converted or reduced value of P, an expanded array cannot be generated from a reduced array for an expanded value of P due to the loss of information that results from the down conversion process.

FIG. 1 is a diagram showing an embodiment of a system for efficient evaluation of sets of resources. As shown in FIG. 1, system 100 includes data source server 102, network 104, client device 106, and sets evaluation server 108. Data source server 102, client device 106, and sets evaluation server 108 communicate with each over network 104. Network 104 may be implemented using data and/or telecommunications networks.

Data source server 102 is configured to obtain identifying information (e.g., identifiers (IDs)) associated with sets of resources. In various embodiments, a "resource" comprises a user, an IP address, or other entity that can be uniquely represented by a corresponding ID. In a first example, data source server 102 is configured to provide a media platform at which videos are uploaded and from which videos are streamed. In the example where data source server 102 comprises a media platform, data source server 102 can record identifying information (e.g., user IDs) of users who are audience members (e.g., users who have viewed and/or engaged) with a video or a set of videos. In a second example, data source server 102 is configured to determine IDs associated with resources by recording/collecting activities at third-party platforms. Data source server 102 can aggregate recorded user activities (e.g., which are recorded via web browser plug-ins) from various client devices. In some embodiments, each resource ID can also be obfuscated. Data source server 102 can group resources into sets based on common attributes associated with the resources. For example, data source server 102 can determine sets of users around common activities (e.g., users that have all viewed a particular set of videos).

A set of resource IDs that is obtained by data source server 102 may not be deduplicated, which is to say that a set of resource IDs may include multiple instances of a resource ID if multiple instances of that resource were determined to be included in that set. For example, if a set of resource IDs was associated with a set of audience members that had viewed a video, then if the same audience member had viewed the video more than once, his or her corresponding resource ID would appear that many times within the set of resource IDs. Because a set of resource IDs may include a large number of IDs and some of which may be duplicate, it would be time consuming and inefficient to iterate through each resource ID in the set to count the exact number of unique resources within the set. As such, it would be desirable to quickly estimate the number of unique IDs (which is the number of unique resources) in each set of resources. Various embodiments described herein describe generating a data structure (e.g., $2^P$ array) to represent each set of resources and these data structures can be used to estimate the number of unique resources in a single set of resources or to estimate the number of unique resources across multiple sets of resources.

Sets evaluation server 108 is configured to generate data structures corresponding to respective sets of resources based on identifying information associated with those sets of resources. In some embodiments, sets evaluation server 108 is configured to generate a data structure comprising a $2^P$ array for each set of resources. As mentioned above, the larger the P value is, the more accurate derived values can be computed from the $2^P$ arrays and the smaller the P value is, the less storage space that is needed to store the $2^P$ arrays and the faster the $2^P$ arrays can be used to compute derived values. To generate a $2^P$ array for a set of resources, sets evaluation server 108 is configured to prepare the $2^P$ array such that each cell/bucket within the array stores the same default/uninitialized value. Sets evaluation server 108 is configured to generate a representation of each resource in the set of resources by generating a (e.g., 128-bit) hash from that resource's ID. Any appropriate hash function can be used to generate a 128-bit hash from the resource ID. One specific example of a hash function is the murmurhash3. Sets evaluation server 108 is then configured to use a first portion of a resource's hash to determine a bucket ID of the $2^P$ array to which to map a "packed integer" (e.g., which may include 16 bits) that is derived from other portions of the hash. For example, the first portion of a resource's hash that is used to determine a corresponding bucket ID (the bucket ID can also be thought of as the bucket index) of the $2^P$ array is taken from a region of the hash that is other than from one end of the hash and where this region is determined as a function of P and this first portion also cannot overlap with a "leading zeroes" region on its left (e.g., 64-P bits) or the "max hash value" (e.g., R bits) region on its right. In various embodiments, sets evaluation server 108 is configured to generate a packed integer for a resource as a combination of a second portion and a third portion of the hash of that resource. For example, the second portion comprises a bit representation (using 6 bits) of the total number of leading zeroes from the most significant bit (the bit furthest to the left) of the hash and the third portion comprises R (e.g., 10) number of bits from the least significant bit (the bit furthest to the right) of the hash, where R is a user configurable value. The number of bits used for the packed integers (P registers) depends on both the value of R and the maximum possible leading zeros. If the maximum leading zeros is defined by (64−P), and with P=14, there needs to be enough bits to be able to represent values 0 thru 50. Therefore, 6 bits should suffice, as $2^6$=64. Then, if R=10, the P registers could use (10+6=16) bits. If a value larger than 10 is chosen for R (e.g., 11), then 17 bits per register will be needed, so 32-bit integers for the P registers can be used (since there is no concept of a 17-bit integer). In some embodiments, packed integers will typically be 6+R bits and where R=10 so the packed integer can be represented by a 16-bit integer. In some embodiments, a fourth, remaining portion of the hash of a resource is discarded and not used for updating the $2^P$ array. The packed integer that is determined from the hash of a resource is then compared to the value that is currently stored in the bucket of the $2^P$ array to which the packed integer was mapped. If the packed integer is larger than the value that is currently stored in the mapped-to bucket of the $2^P$ array or if that value that is currently stored in the mapped-to bucket is the default/uninitialized value, then the packed integer is stored in that bucket to replace the previously stored, smaller/default/uninitialized value. Otherwise, if the packed integer is not larger than the initialized value that is currently stored in the mapped-to bucket of the $2^P$ array, then the currently stored value in the bucket is not replaced. If multiple hashes are mapped to the same bucket of the $2^P$ array, then only the largest packed integer thereof will be stored in that bucket, meaning that packed integers associated with fewer than all the resources in a set may be directly represented in the array. After sets evaluation server 108 is configured to process the hash of each resource in a set of resources in this way, the resulting $2^P$ array that corresponds to that set of resources should include in each of its buckets, the largest packed integer that had been mapped to that bucket, if any, or the default value. The $2^P$ array can then be stored by sets evaluation server 108 to represent the set of resources, without having to store the hashes or the original IDs of the resources. In some embodiments, sets evaluation server 108 is configured to store the $2^P$ array corresponding to each set of resources in the form of an object (which is sometimes referred to as a "BetaMaxHash" object). For example, a "BetaMaxHash" object includes, but is not limited to, a $2^P$ array and the configuration parameters of P and R.

Sets evaluation server 108 is configured to generate new, reduced $2^P$ arrays corresponding to sets of resources in response to a user input of an updated, reduced P value. In various embodiments, after sets evaluation server 108 has already generated a $2^P$ array corresponding to a set of resources based on the identifying information associated with the set of resources, sets evaluation server 108 receives an instruction to "down convert" the existing $2^P$ array based on a new, smaller value of P. As mentioned above, a user may want to change the value of P to a new, smaller value in order to reduce the storage space that is needed to store the $2^P$ arrays and/or to speed up the computations that are performed on the $2^P$ arrays. Based on receiving a new, reduced P value, sets evaluation server 108 can down convert a previously generated $2^P$ array (that was determined using a previous, larger value of P) into a new array based on the new, reduced P value. Put another way, sets evaluation server 108 can down convert an existing $2^P$ array associated with a set of resources based on a new, reduced value of P without re-obtaining the original IDs or hashes thereof of the resources included in that set of resources.

Sets evaluation server 108 is configured to compute derived values associated with two or more sets of resources based on the respective data structures (e.g., $2^P$ arrays) associated with those sets of resources. In some embodiments, sets evaluation server 108 is configured to receive a request from a client device such as client device 106. The request may identify one or more sets of resources and a requested evaluation operation to be determined for the identified set(s) of resources. For example, the identifying information associated with one or more sets of resources may specify the identifier associated with the set(s). Also, for example, the requested evaluation operation may be determined for a single set of resources (e.g., the cardinality/number of unique resources from the single set of resources) or be determined for multiple sets of resources (e.g., the union cardinality/number of unique resources across two or more sets of resources or the intersection cardinality/number of unique resources between two or more sets of resources). In response to the request from client device 106, sets evaluation server 108 is configured to obtain the previously determined data structure (e.g., $2^P$ array) corresponding to each set of resources that is identified by the request and then perform the requested evaluation operation on the $2^P$ array(s) to determine the requested value (e.g., the cardinality of a single set of resources or the cardinality of the union across/the cardinality of the intersection between multiple sets of resources).

For example, if a set of resources comprises the set of audience members for a set of videos, then client device 106 could request sets evaluation server 106 to determine the union (e.g., number of unique audience members) across two different sets of videos. In response to this request, sets evaluation server 108 is configured to retrieve the two $2^P$ arrays corresponding to the sets of audience members corresponding to the identified two different sets of videos and then determine the union of unique audience members across the two different sets of videos using the two $2^P$ arrays.

In some embodiments, data source server 102 and sets evaluation server 108 can be implemented as one server that performs the functions that were described above for both data source server 102 and sets evaluation server 108.

As described above, system 100 provides techniques that can generate a lightweight $2^P$ array for each set of resources with a reconfigurable (e.g., reducible) value of P. Furthermore, the original IDs of the resources that are included in each set are processed such that less than the entire hashes of such IDs are actually stored in the $2^P$ arrays and also fewer than all of the hashes of a set are actually represented in that set's corresponding $2^P$ array. One result of such a manner of storage is that a $2^P$ array corresponding to a set of resources cannot be mapped back to the individual resources (e.g., users) for which the array is representing, thereby anonymizing and ensuring the privacy of the specific users for which the arrays are maintained to represent.

Figure 2:
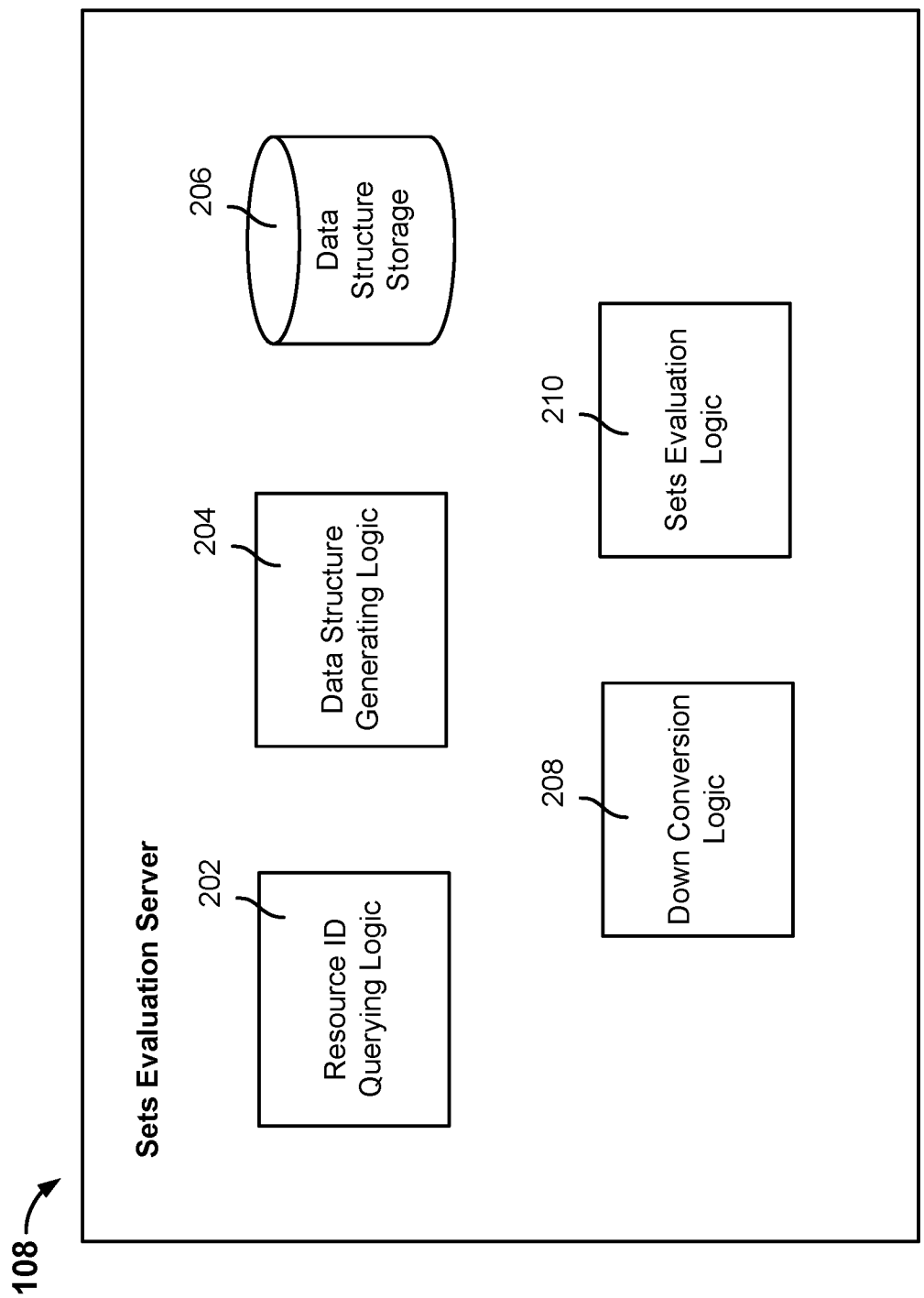
FIG. 2 is a diagram showing an example of a sets evaluation server.

FIG. 2 is a diagram showing an example of a sets evaluation server. In some embodiments, sets evaluation server 108 of system 100 of FIG. 1 may be implemented, at least in part, using the example sets evaluation server shown in FIG. 2. In the example of FIG. 2, the example sets evaluation server includes resource ID querying logic 202, data structure generating logic 204, data structure storage 206, down conversion logic 208, and sets evaluation logic 210. Each of resource ID querying logic 202, data structure generating logic 204, down conversion logic 208, and sets evaluation logic 210 may be implemented using one or more of hardware and software. Data structure storage 206 may be implemented using any type of storage medium.

Resource ID querying logic 202 is configured to obtain identifying information (e.g., IDs) corresponding to resources associated with each of one or more sets from one or more data sources. In some embodiments, a set of resources is defined by a set of criteria. In a first example, a set of resources comprises a set of users who have engaged/viewed at least a portion of any video in a set of videos (e.g., that are streamed at a media platform). In a second example, a set of resources comprises a set of IP addresses associated with devices on which a designated activity had been performed. For example, an ID associated with a resource is a string of alphanumeric numbers that uniquely identifies that resource.

Data structure generating logic 204 is configured to obtain sets of resource IDs from resource ID querying logic 202 and generate representations based on the resource IDs. In various embodiments, data structure generating logic 204 is configured to generate a hash based on each resource ID in a set. In one example, each hash is 128-bit long and the same resource ID will always hash to the same value. Data structure generating logic 204 is configured to prepare a new data structure for each new set of resource IDs that it is to process. In some embodiments, the new data structure comprises a $2^P$ array, which is an array of $2^P$ buckets, each with a corresponding bucket ID (index) ranging from bucket ID 0 to bucket ID $2^P-1$. For example, initializing a $2^P$ array comprises to store a default/uninitialized value (e.g., 0) in each bucket of the $2^P$ array. Data structure generating logic 204 is configured to process the hash of each resource ID in a set and determine whether to update the $2^P$ array corresponding to that set of resources using portions of that hash. In some embodiments, data structure generating logic 204 is configured to use a first portion of the hash of a resource ID to determine a corresponding bucket ID of the $2^P$ array. For example, this first portion of the hash is taken from a region of the hash that is determined based on P and does not include either the most significant bit or the least significant bit of the hash. As mentioned above, this first portion of the hash does not overlap with the region of the hash that is used for determining the number of leading zeroes or the region of the hash that comprises the max hash value. Put another way, this first (e.g., P-length) portion of the hash that is used to determine the bucket ID can be located anywhere between the region of the hash that is used for determining the number of leading zeroes or the region of the hash that comprises the max hash value, and not necessarily adjacent to one of these regions. Data structure generating logic 204 is configured to then generate a packed integer from the hash using a second and third portion of the hash. For example, the second portion comprises a bit representation (6 bits) of the total number of leading zeroes from the most significant bit (the bit furthest to the left) of the hash and the third portion comprises R (e.g., 10) number of adjacent bits including the least significant bit (the bit furthest to the right) of the hash. In some embodiments, the remaining, fourth portion of the hash is discarded/ignored and not used for updating the $2^P$ array. Data structure generating logic 204 is configured to compare the packed integer that is derived from the hash to the current value that is stored in the bucket of the $2^P$ array that had been determined based on the first portion of the hash. If the packed integer is larger than the value that is currently stored in the mapped-to bucket of the $2^P$ array or if that value that is currently stored in the mapped-to bucket is the default/uninitialized value, then the packed integer is stored in that bucket to replace the previously stored, smaller/default/uninitialized value. Otherwise, if the packed integer is not larger than the initialized value that is currently stored in the mapped-to bucket of the $2^P$ array, then the currently stored value in the bucket is not replaced. If multiple hashes are mapped to the same bucket of the $2^P$ array, then only the largest packed integer thereof will be stored in that bucket, meaning that packed integers associated with fewer than all the resources in a set may be directly represented in the array. After data structure generating logic 204 is configured to process the hash of each resource in a set of resources in this way, the resulting $2^P$ array that corresponds to that set of resources should include in each of its buckets the largest packed integer that had been mapped to that bucket, if any, or the default value. Data structure generating logic 204 is configured to store the $2^P$ array that has been determined for each set of resources at data structure storage 206 in place of storing the resource IDs or the hashes thereof. Going forward, estimates of the number of unique resources associated with a set of resources will be computed using the current $2^P$ array that is stored for that set of resources at data structure storage 206.

Data structure storage 206 is configured to store data structures (e.g., $2^P$ arrays) corresponding to sets of resources. In some embodiments, data structure storage 206 is configured to store each $2^P$ array in the form of an object (e.g., a "BetaMaxHash" object).

Down conversion logic 208 is configured to generate a new, smaller data structure (e.g., array) for each set of resources based on user input/selection of a reduced P value and a previously generated $2^P$ array (e.g., stored at data structure storage 206) for that set of resources. For example, if P had been set to 14 and a $2^{14}$ array had been generated for a set of resources, then after P is adjusted to be 12, down conversion logic 208 is configured to generate a new $2^{12}$ array corresponding to that same set of resources by merging together the packed integers that had been stored in buckets of the $2^{14}$ array. Because each time that a previous P value is reduced by one, the number of new buckets in the resulting $2^P$ array is halved as compared to the number of buckets associated with the previous P value. As such, the number of packed integers that are to be merged together from the existing array to determine the value to store in each bucket of the new, reduced array is determined as a function of the new, reduced P. To down convert an existing $2^P$ array into a new, reduced array with a new, reduced value of P, down conversion logic 208 is configured to modify the bucket IDs of the existing $2^P$ array based on the difference between the previous value of P and the new, smaller value of P and then map each bucket from the existing $2^P$ array to a new bucket of the new array based on the bucket's modified bucket ID. As will be explained in further detail below, because the packed integer includes the number of leading zeros from the most significant bit of the original (e.g., 128-bit) hash, the packed integers that are stored in an existing $2^P$ array are not affected by the reduction of the value of P. Then, the packed integers stored in the buckets of the existing $2^P$ array that are mapped to the same bucket in the new, reduced array are merged together by being compared to each other and having the largest one of such packed integers selected to be stored in the new, reduced array. After all buckets from the existing $2^P$ array are mapped to buckets in the new, reduced array and their respective packed integers merged together, the resulting new, reduced $2^P$ array will be stored at data structure storage 206 and will continue to represent that set of resources for subsequent computations.

Sets evaluation logic 210 is configured to determine the number of unique resources (this number is sometimes referred to as the "cardinality") in a single set of resources or to compute derived values associated with two or more sets of resources based on the respective data structure(s) (e.g., $2^P$ array(s)) associated with those set(s) of resources. In some embodiments, sets evaluation logic 210 is configured to receive a request from a client device that identifies one or more sets of resources and a requested evaluation operation to be determined for the identified set(s) of resources. For example, the identifying information associated with one or more sets of resources specifies the identifier(s) associated with the set(s). Also, for example, the requested evaluation operation may be determined for a single set of resources (e.g., the cardinality/number of unique resources from the single set of resources) or be determined for multiple sets of resources (e.g., the cardinality of the union across two or more sets of resources or the cardinality of the intersection between two or more sets of resources). In response to the request, sets evaluation logic 210 is configured to obtain the previously determined data structure (e.g., $2^P$ array) corresponding to each set of resources that is identified by the request and then perform the requested evaluation operation on the $2^P$ array(s) to determine the requested value (e.g., the cardinality of a single set of resources or the cardinality of the union across/the cardinality of the intersection between multiple sets of resources), as will be described in further detail below. Because sets of evaluation logic 210 are performing the requested computations based on the stored lightweight $2^P$ arrays rather than the large sets of resource IDs from which the arrays were derived, sets of evaluation logic 210 can efficiently estimate (in real-time) the requested cardinality of a single set of resources or the derived value associated with two or more sets of resources and the timely return of the results back to the requesting client device.

Figure 3:
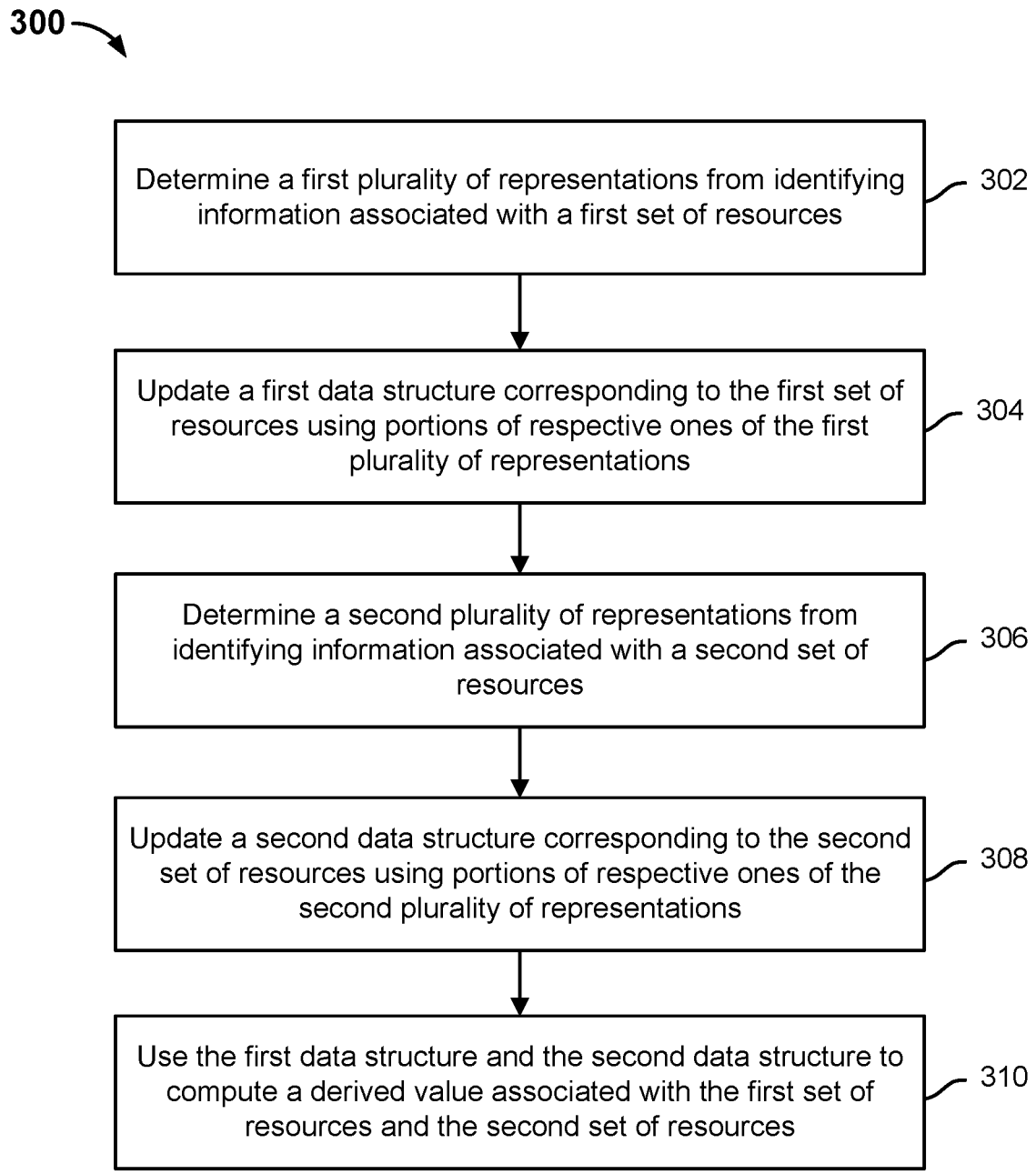
FIG. 3 is a flow diagram showing an embodiment of a process for performing an evaluation of sets of resources.

FIG. 3 is a flow diagram showing an embodiment of a process for performing an evaluation of sets of resources. In some embodiments, process 300 can be implemented by sets evaluation server 108 of system 100 of FIG. 1.

At 302, a first plurality of representations is determined from identifying information associated with a first set of resources. A representation of a predetermined size (e.g., a predetermined number of bits) is derived from the identifying information (e.g., ID) of each resource in a first set of resources. In some embodiments, the representation comprises a 128-bit hash of each resource ID. For example, the resource ID may comprise a user ID or an IP address. In general, a resource ID can uniquely identify a resource. Put another way, two or more instances of the same resource ID in the first set of resource IDs denote the presence of as many instances of that corresponding resource in the set.

At 304, a first data structure corresponding to the first set of resources is updated using portions of respective ones of the first plurality of representations. In various embodiments, a $2^P$ array is prepared and then updated based on the representations (e.g., hashes) of the first set of resource IDs to represent that set of resources, where P is a user configured value. In some embodiments, to prepare the $2^P$ array, each bucket/cell in the array is updated to store a default value (e.g., 0). The prepared $2^P$ array is then updated based on the hashes of the first set of resource IDs. In some embodiments, and as will be described in further detail below, each hash of the first set of resource IDs is processed by using a first portion of the hash to determine a bucket of the $2^P$ array. Then a second and third portion of the hash are used to generate a packed integer that is compared against the current value that is stored in the determined/mapped-to bucket of the $2^P$ array. If that packed integer is greater than the current value or if that value that is currently stored in the mapped-to bucket is the default/uninitialized value, then the packed integer is stored in that bucket to replace the previously current value. As will be described in further detail below, a packed integer, even in combination with its position in the $2^P$ array, cannot be used to reconstruct the hash because fewer than all the bits of the hash had been used to generate the packed integer. Put another way, a portion of the hash is discarded/ignored in the derivation of the corresponding packed integer. Specifically, in some embodiments, the portion of the hash that is discarded/ignored to arrive at the corresponding packed integer includes all the bits of the (e.g., first $2^N$-P of the hash) "second" portion of the hash for counting the leading zeroes after the first "1" and a fixed section in the hash. After each hash associated with the first set of resource IDs is processed, the updated $2^P$ array includes in each bucket, either the default value or the largest packed integer that had been mapped to that bucket.

At 306, a second plurality of representations is determined from identifying information associated with a second set of resources. Representations (e.g., hashes) can be determined from the resource IDs associated with the second set of resources in a way similar to how the representations were determined from the resource IDs associated with the first set of resources.

At 308, a second data structure corresponding to the second set of resources is updated using portions of respective ones of the second plurality of representations. An updated $2^P$ array can be generated from the hashes associated with the second set of resource IDs in a way similar to how the $2^P$ array was generated for the first set of resources.

At 310, the first data structure and the second data structure are used to compute a derived value associated with the first set of resources and the second set of resources. The respective $2^P$ arrays corresponding to the first and second resources can be used to estimate a derived value (e.g., a numerical characteristic) associated with the two sets of resources. In some embodiments, the $2^P$ arrays can be used to determine the cardinality of a union of resources (e.g., the number of unique resources) across both the first and second sets of resources. Put another way, the union represents the number of unique resources that are included in either one or both of the first and second sets of resources. In some embodiments, the $2^P$ arrays can be used to determine the cardinality of an intersection of resources (e.g., the number of unique resources) between the first and second sets of resources. Put another way, the intersection represents the number of unique resources that are included in both the first and second sets of resources. The determination of derived values can be extended to three or more sets of resources based on their respective data structures using techniques described herein.

Figure 4:
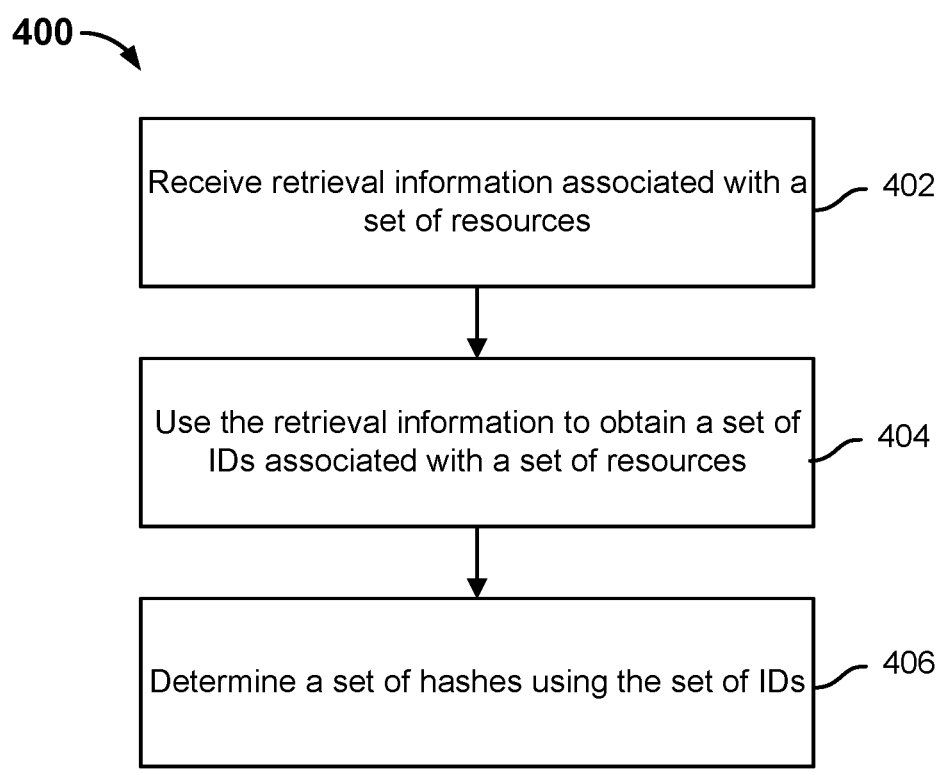
FIG. 4 is a flow diagram showing an example of a process for obtaining identifying information associated with a set of resources.

FIG. 4 is a flow diagram showing an example of a process for obtaining identifying information associated with a set of resources. In some embodiments, process 400 can be implemented by sets evaluation server 108 of system 100 of FIG. 1. In some embodiments, each of one or both of steps 302 and/or 306 of process 300 of FIG. 3 may be implemented, at least in part, using process 400.

At 402, retrieval information associated with a set of resources is received. For example, the retrieval information can be any information that is used to identify a set of resources. In a specific example, the retrieval information is a URL associated with a video or a set (e.g., channel) of videos and is used to query for the IDs of users (resources) that have viewed or engaged with at least one video (e.g., over a given period of time). Each ID uniquely identifies a corresponding resource.

At 404, the retrieval information is used to obtain a set of IDs associated with a set of resources. For example, a data source server can be queried using at least the retrieval information to obtain the IDs associated with resources that pertain to the retrieval information. A resource may meet the criteria to be associated with the retrieval information more than once and therefore, that resource's corresponding ID may also appear within the queried set of IDs as many times.

At 406, a set of hashes is determined using the set of IDs. Each ID can be input into a hash function to determine a corresponding hash. For example, the resulting hash is 128 bits long.

Figure 5:
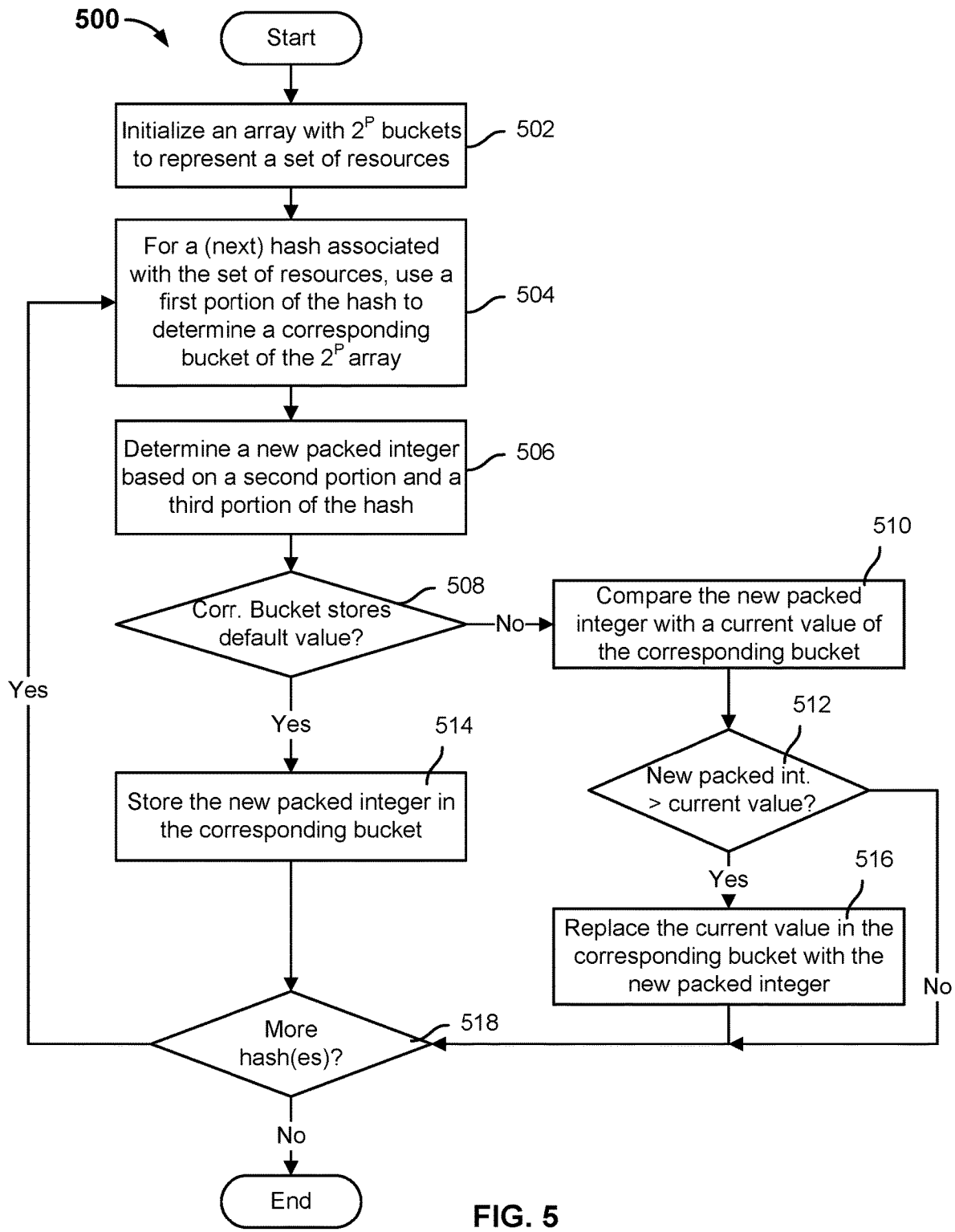
FIG. 5 is a flow diagram showing an example of a process for updating a data structure using portions of a hash derived from a resource ID.

FIG. 5 is a flow diagram showing an example of a process for updating a data structure using portions of a hash derived from a resource ID. In some embodiments, process 500 can be implemented by sets evaluation server 108 of system 100 of FIG. 1. In some embodiments, either one or both of steps 304 and/or 308 of process 300 of FIG. 3 may be implemented using process 500.

At 502, an array with $2^P$ buckets is prepared to represent a set of resources. P is a user selected value. For example, P is set to 14. For example, the $2^P$ array is prepared by setting the value of each bucket/cell of the array to a default/uninitialized value (e.g., 0). Each bucket/cell of the array is associated with a corresponding bucket ID/index.

At 504, for a (next) hash associated with the set of resources, a first portion of the hash is used to determine a corresponding bucket of the $2^P$ array. For example, using a process such as process 400 of FIG. 4, a corresponding hash is derived from the ID of each resource in a set of resources. A first portion of a hash is used to determine a bucket ID. For example, this first portion of the hash comprises a region of the 128-bit hash that does not include the most significant bit of the hash but rather, the P number of bits after $2^N$–P bits starting from the most significant bit of the hash, where N represents the number of bits that is to be used to represent the number of leading zeros in the first P number of bits (starting from the most significant bit) of the hash. The value of this first portion of the hash is then used as the bucket ID to which the packed integer that is to be derived from two other portions of the hash is to be mapped.

At 506, a new packed integer is determined based on a second portion and a third portion of the hash. For example, a packed integer is determined as a combination of the N-bit binary representation of the number of leading zeros in the first P number of bits of the hash (starting from the most significant bit) and the last R bits (including the least significant bit) of the hash. In a specific example, the packed integer is represented by 16 bits, where N=6 and R=10. As such, a second portion of the hash can be the first $2^N$–P number of bits of the hash (starting from the most significant bit), which is evaluated to determine the number of zeros there are starting from the most significant of the $2^N$–P bits before an "1" bit appears. The number of leading zeros is then represented in binary by N bits. The third portion of the hash can directly be the last R bits of the hash, including the least significant bit. The packed integer can be the concatenation of the N bits and the R bits.

In some embodiments, the remaining portion of the hash that is not used to map to a bucket of the $2^P$ array or used to determine a corresponding new packed integer is ignored/discarded for the purpose of updating the $2^P$ array.

At 508, it is determined whether the corresponding bucket is storing the default value. In the event that the corresponding bucket is not storing the default value, control is transferred to 510. Otherwise, in the event that the corresponding bucket is storing the default value, control is transferred to 514.

At 514, the new packed integer is stored in the corresponding bucket. If the bucket of the $2^P$ array to which the new packed integer was mapped is still storing the default value to which that bucket was set when the $2^P$ array was initialized, then the default value is replaced with the new packed integer.

At 510, the new packed integer is compared with a current value of the corresponding bucket. If the bucket of the $2^P$ array to which the new packed integer was mapped is no longer storing the default value but another value, then the current value that is stored in the mapped-to bucket is compared to the new packed integer.

At 512, it is determined whether the new packed integer is greater than the current value. In the event that the new packed integer is greater than the current value, control is transferred to 516. Otherwise, in the event that the new packed integer is not greater than the current value, control is transferred to 518.

At 516, the current value in the corresponding bucket is replaced with the new packed integer. Only if the new packed integer is greater than the current value that is stored at the corresponding bucket is the current value replaced with the new packed integer.

At 518, it is determined whether there is at least one more hash associated with the set of resources. In the event that there is at least one more hash associated with the set of resources, control is returned to 504. Otherwise, in the event that there are no more hashes associated with the set of resources, process 500 ends. Each hash that is derived from a resource ID associated with the set of resources is evaluated using steps 504 through 516 to determine whether a new packed integer that is generated from the hash should be stored in a bucket in the $2^P$ array.

Figure 6:
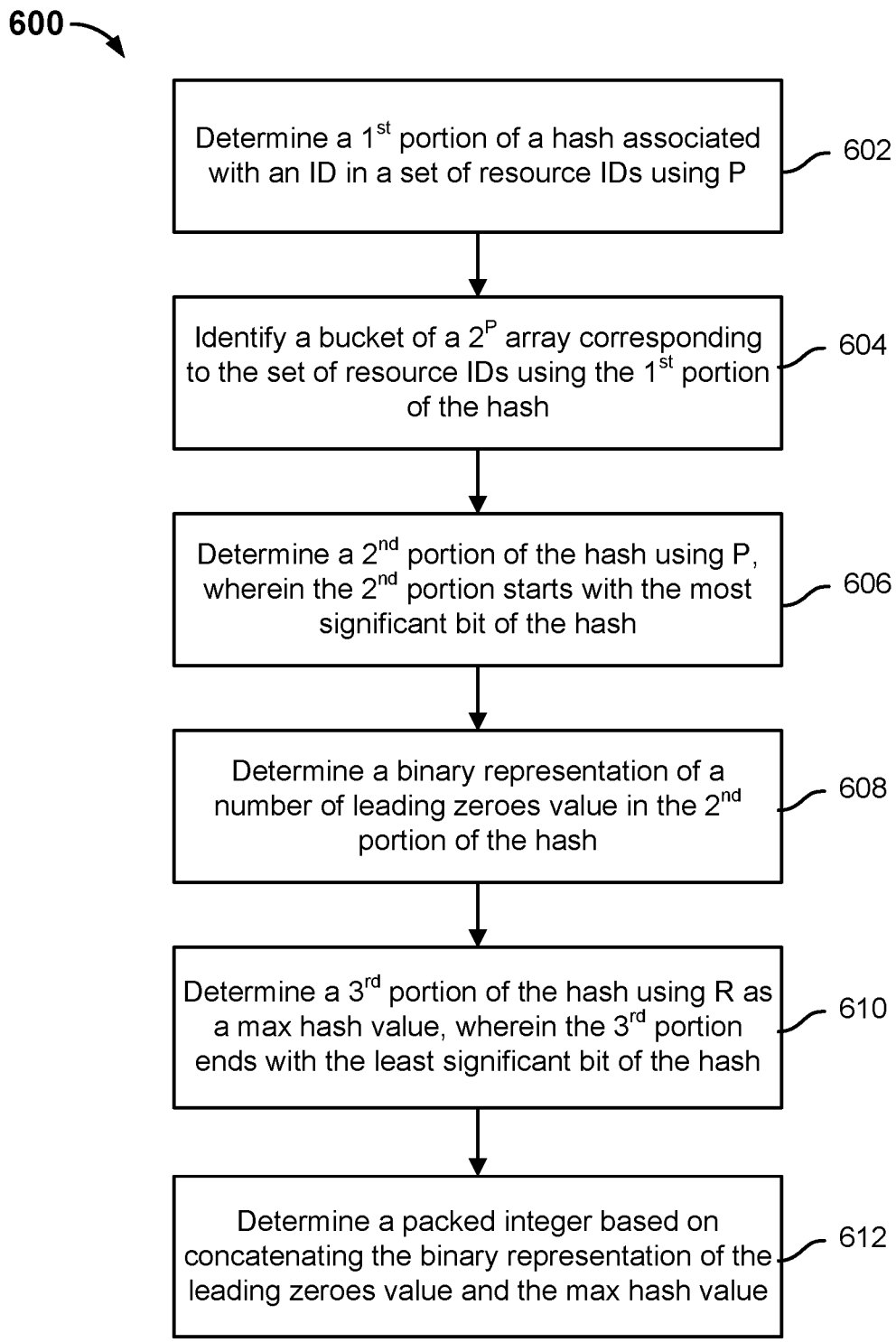
FIG. 6 is a flow diagram showing an example of a process for generating a packed integer from a hash of a resource ID.

FIG. 6 is a flow diagram showing an example of a process for generating a packed integer from a hash of a resource ID. In some embodiments, process 600 can be implemented by sets evaluation server 108 of system 100 of FIG. 1. In some embodiments, steps 504 and 506 of process 500 of FIG. 5 may be implemented, at least in part, using process 600.

At 602, a first portion of a hash associated with an ID in a set of resource IDs is determined using P. For example, the hash that is determined from a resource ID is 128 bits long. In some embodiments, this first portion is a region of the hash that does not include either the most significant (left-most) bit or the least significant (right-most) bit of the hash. This first portion is a region that starts from the bit of the hash associated with the "$2^N$–P" position in the hash and is P bits long. For example, N is chosen to be the number of bits in the packed integer that is to be used to represent the maximum number of leading zeros that could be included in the first "$2^N$–P" bits of the hash. Put another way, this first portion comprises the bits in the hash from position/index "$2^N$–P" to position/index "$2^N$–1" (assuming that the first bit of the 128-bit hash is in position/index "0"). The value of the binary representation from position "$2^N$–P" to position "$2^N$" of the hash is then determined as the bucket ID to which the packed integer that is to be determined from the hash is to be mapped.

At 604, a bucket of $2^P$ array corresponding to the set of resource IDs is identified using the first portion of the hash. The value of the binary representation from position/index "$2^N$–P" to position/index "$2^N$–1" of the hash is then determined as the bucket ID to which the packed integer that is to be determined from the hash is to be mapped.

At 606, a second portion of the hash is determined using P, wherein the second portion starts with the most significant bit of the hash. In some embodiments, this second portion of the hash is the region of the hash that comprises the first $2^N$–P bits of the hash (including the most significant, left-most bit).

At 608, a binary representation of a number of leading zeroes value in the second portion of the hash is determined. The number of "leading zeroes" is determined from the second portion (the first $2^N$–P bits) of the hash. The "leading zeroes" refers to the number of consecutive zero value bits there are starting from the left-most bit of this second portion before a one value bit is encountered. For example, the number of leading zeros from this second portion of the hash is represented by an N-bit value.

At 610, a third portion of the hash is determined using R as a max hash value, wherein the third portion ends with the least significant bit of the hash. This third portion of the hash, which is sometime referred to as the "max hash value," is the last R bits (including the least significant, right-most bit) of the hash.

At 612, a packed integer is determined based on concatenating the binary representation of the leading zeroes value and the max hash value. For example, the packed integer corresponding to the hash is determined as a concatenation of the binary representation of the number of leading zeros in the second portion of the hash and the max hash value (the last R bits of the hash). This packed integer is then compared to the current value that is stored at the bucket of the $2^P$ array that was determined at step 604 to determine whether the packed integer is greater than that current value and should therefore replace the current value in that bucket. An example of determining a packed integer from a 128-bit hash using process 600 is described below in FIG. 7.

Figure 7:
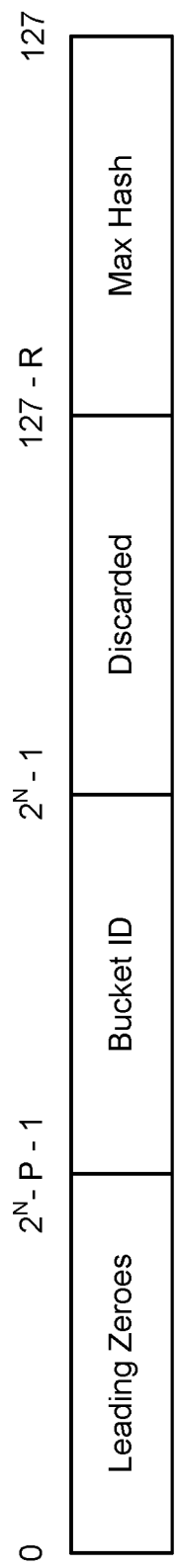
FIG. 7 is a diagram showing an example of how various portions of a 128-bit hash that is derived from a resource ID can be used to update a $2^P$ array corresponding to a set of resource IDs.

FIG. 7 is a diagram showing an example of how various portions of a 128-bit hash that is derived from a resource ID can be used to update a $2^P$ array corresponding to a set of resource IDs. FIG. 7 shows the 128-bit hash (where the most significant, left-most bit is referred to as being in the "0" position and the least significant, right-most bit is referred to as being in the "127" position) with various bit positions labeled ("0," "$2^N$–P–1," "$2^N$–1," "127–R," and "127"). As mentioned above, a "first" portion of the 128-bit hash (e.g., that is used to determine a bucket of the $2^P$ array as described in steps 602 and 604 of process 600 of FIG. 6) comprises the bits from the "$2^N$–P" position to the "$2^N$–1" position of the hash. This "first" portion/region is labeled as "Bucket ID" because its value is used as the bucket ID of the $2^P$ array to which a packed integer that is to be derived from the hash is to be mapped. As mentioned above, a "second" portion of the 128-bit hash (e.g., that is used to determine the number of "leading zeroes" as described in steps 606 and 608 of process 600 of FIG. 6) comprises the first $2^N$–P bits of the hash comprising the bits from the "0" position to the "$2^N$–P–1" position of the hash. This "second" portion/region is labeled "Leading Zeroes" because the binary representation of the number of leading zeros in this region is referred to as the "leading zeroes" value. As mentioned above, a "third" portion of the 128-bit hash (e.g., that is used to determine the "max hash value" as described in step 610 of process 600 of FIG. 6) comprises the last R bits of the hash comprising the bits from the "127–R" position to the "127" position of the hash. This "third" portion/region is labeled "Max Hash" because the bits in this region are referred to as the "max hash value." In some embodiments, the binary representation of the "leading zeroes" value is concatenated to the "max hash value" to determine a "packed integer" (of length N+R) corresponding to the hash.

Note that the remaining region of the 128-bit hash (comprising bits at the "$2^N$" position to the "127–R–1" position) is not used to determine the packed integer nor the corresponding bucket in the $2^P$ array for the hash. This remaining portion of the hash is effectively discarded or ignored. As such, a packed integer cannot be used to reconstruct the original 128-bit hash from which it was derived, which could advantageously anonymize a packed integer where privacy/security of the hash (or resource ID from which the hash was determined) is a concern.

Also, note that because the leading zeros part of the packed integer is determined from the first $2^N$–P bits of the hash, even if the value of P is reduced (in a "down conversion" process, as will be described in further detail below), the determination of the number of leading zeros in the first $2^N$–P bits of the hash is minimally affected (except for the edge case in which all $2^N$–P first bits of a hash were zeroes). The determination of using the first $2^N$–P bits of the hash to determine the number of leading zeros value of a packed integer therefore allows the packed integer that is generated from using a previous value of P to be minimally affected when the value of P is reduced to a smaller value.

While FIG. 7 shows an example where the "leading zeroes" value is determined from the first $2^N$–P bits of the hash, in an alternative example that is not shown in FIG. 7, the "leading zeroes" value is determined from the first $2^N$ bits of the hash. Where N=6, the first $2^N$ bits of the hash would be the first 64 bits of the hash. One advantage to this approach is that the "leading zeroes" value is completely independent of the value of the P and as such, even when the value of P is down converted to reduce the size of the $2^P$ arrays, the "leading zeroes" value portion of each packed integer will never be impacted. However, using the first $2^N$ bits of the hash to determine the "leading zeroes" value will affect the number of bits to be "dropped" (or ignored) in the process of deriving a packed integer from that hash. First, in contrast to the example regions shown in FIG. 7 and where the "fixed discard region" is $2^N$–R bits long, in the alternative example where the "leading zeroes" value is determined from the first $2^N$ bits of the hash, the "fixed discard region" becomes $2^N$–P–R bits long. Second, a variable number of bits will be dropped in this alternative example after the first "1" in the first $2^N$ bits of the hash.

Figure 8A:
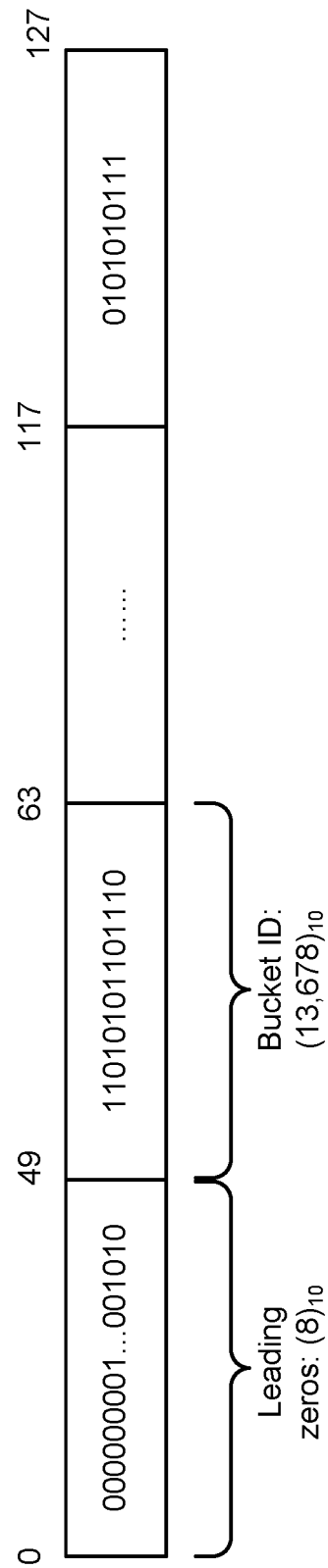
FIG. 8A shows an example of determining a corresponding bucket and a packed integer from a 128-bit hash using process 600 of FIG. 6 and the example of FIG. 7.
Figure 8B:
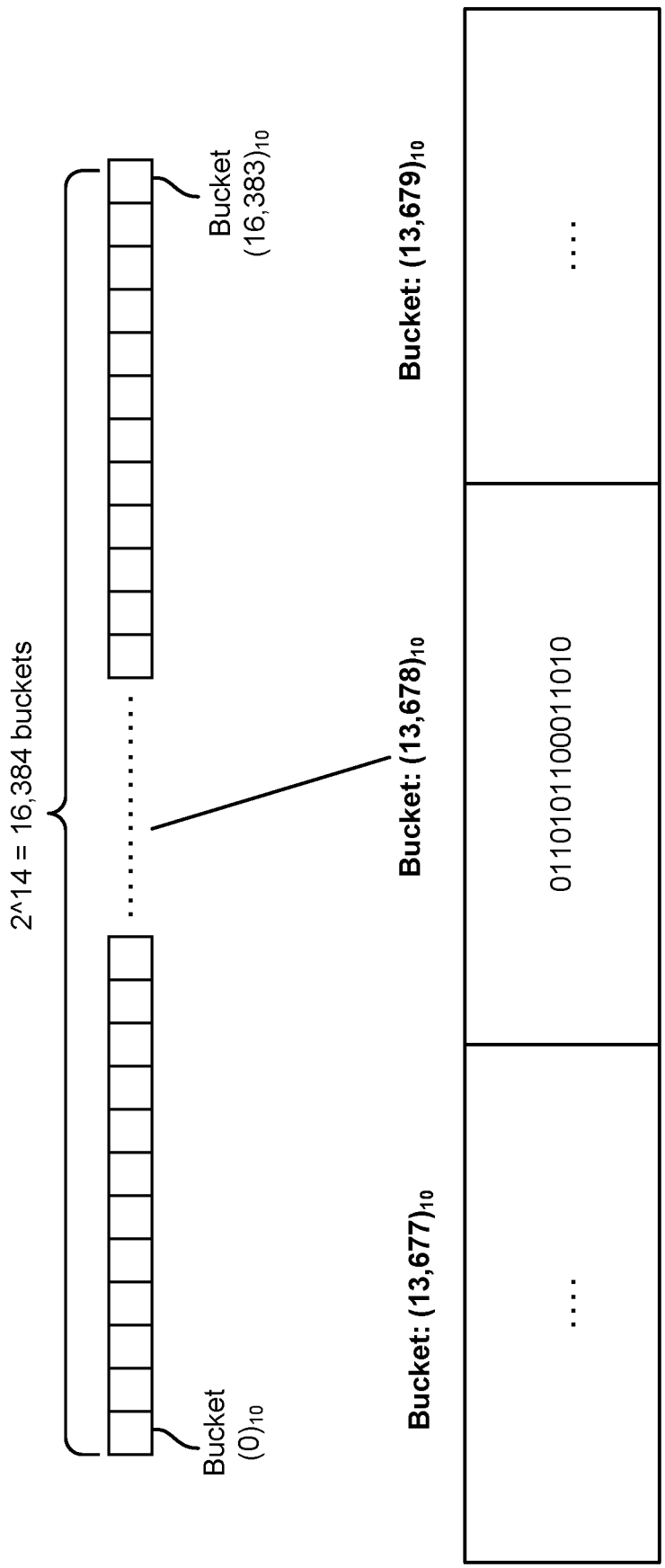
FIG. 8B shows an example of comparing the packed integer that was generated in FIG. 8A against the current value that is stored in the corresponding bucket of the $2^{14}$ array to which the packed integer was mapped.

FIGS. 8A and 8B show an example of generating a packed integer from a hash and using it to potentially update a $2^P$ array.

FIG. 8A shows an example of determining a corresponding bucket and a packed integer from a 128-bit hash using process 600 of FIG. 6 and the example of FIG. 7. Given that in the example of FIG. 8A, N=6, P=14, and R=10, the previous bit positions ("0," "$2^N$–P–1," "$2^N$–1," "127–R," and "127") now become ("0," "49," "63," "117," and "127"), which are labeled in the example 128-bit hash that was shown in FIG. 7. The corresponding bucket to which to map a packed integer associated with the 128-bit hash is determined using the "first" portion of the 128-bit hash, comprising the bits from position "50" through position "63." These 14 bits are "11010101101110," which is 13,678 in decimal. As such, the packed integer will be mapped to the bucket in the $2^{14}$ array at the bucket in the "13,678" position. The packed integer is determined by first determining the number of leading zeros in the "second" portion/region of the hash, comprising the bits from position "0"

through position "49." These 50 bits are "000000001 . . . 001010," which includes 8 leading zeros. To represent the decimal value 8 in N=6 bits, the leading zeroes binary representation is "001000." Next, the "third" portion/region of the hash comprising the bits from position "118" through position "127" ("0101010111") are directly used as the "max hash value." The packed integer corresponding to this example hash is therefore the concatenation of the 6-bit leading zeroes value ("001000") and the 10-bit max hash value ("0101010111"), which is the 16-bit value of "0010000101010111" (or 8538 in decimal).

Note that the bits of the 128-bit hash from position "64" through "117" are discarded/ignored for the purpose of determining the corresponding bucket and also for generating the packed integer.

FIG. 8B shows an example of comparing the packed integer that was generated in FIG. 8A against the current value that is stored in the corresponding bucket of the $2^{14}$ array to which the packed integer was mapped. A $2^{14}$ array has 16,384 buckets, each with a corresponding bucket ID ranging from "0" to "16,383" in decimal. As described above with FIG. 8A, the new packed integer ("0010000101010111," which is not shown in FIG. 8B) is mapped to bucket ID "13,678." As such, the new packed integer is compared against the current value ("0110101100011010") that is stored at bucket ID "13,678." Binary values can be efficiently compared by making bit-by-bit comparisons starting from the most significant bit (the leftmost bit) and the comparison can end whenever it determines that one of the compared binary values has a "1" where the other binary value(s) have a "0," and is therefore the larger(est) binary value in the comparison. In the example of FIGS. 8A and 8B, the current value ("0110101100011010") that is stored in bucket ID 13,678 is larger than the new packed integer ("0010000101010111") and so the current value is maintained and the new packed integer is not saved in the $2^{14}$ array.

Figure 9:
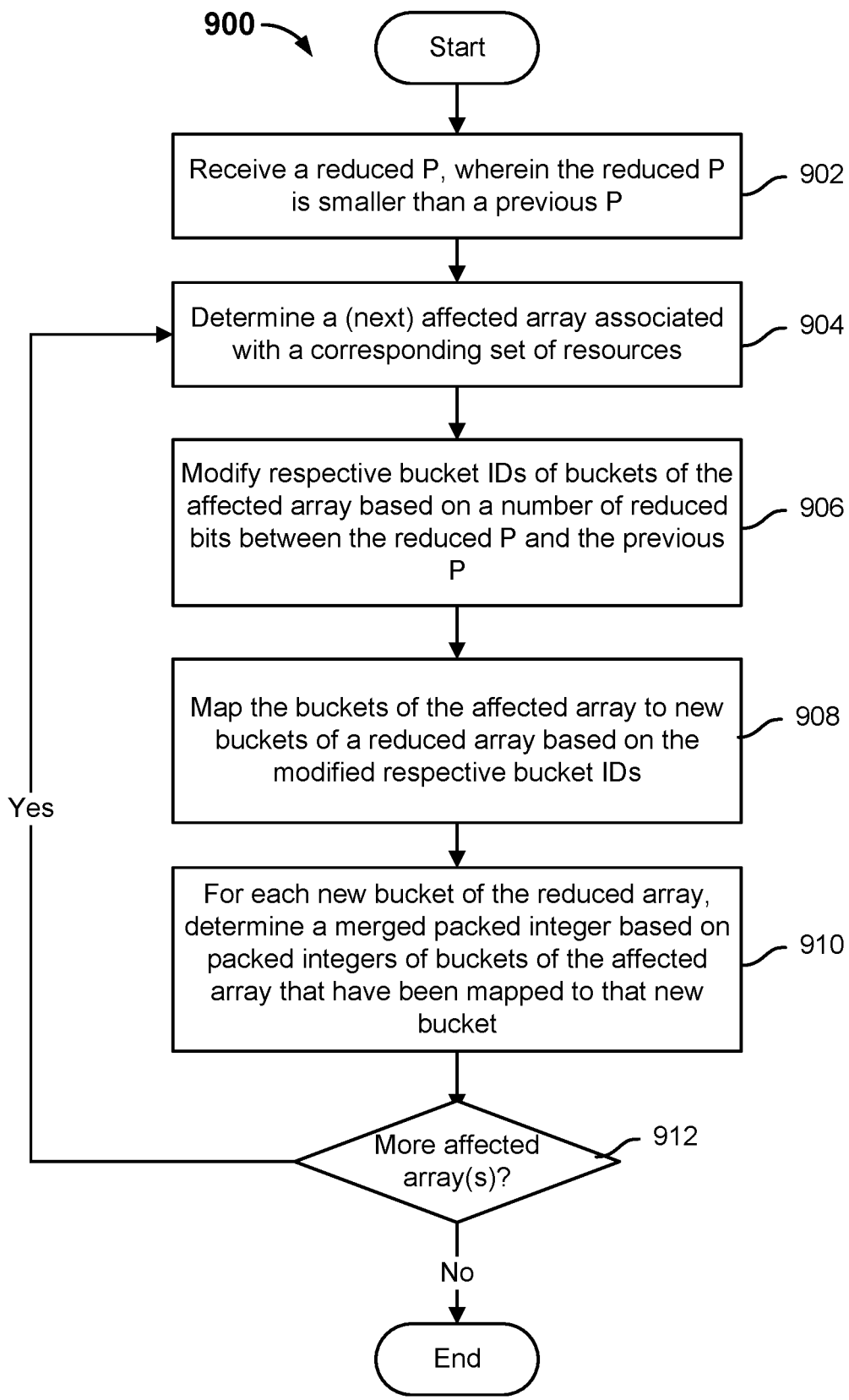
FIG. 9 is a flow diagram showing an example of a process for down converting data structures associated with sets of resources based on a reduced value of P.

FIG. 9 is a flow diagram showing an example of a process for down converting data structures associated with sets of resources based on a reduced value of P. In some embodiments, process 900 can be implemented by sets evaluation server 108 of system 100 of FIG. 1.

Process 900 is an example process that describes "down converting" a data structure (e.g., an array) representing a set of resources that was determined based on a configured P value to a new, smaller data structure (e.g., a shorter array) based on a newly configured smaller value for P. As mentioned above, because P is the parameter that dictates the length/size of each array that represents a set of resources in an evaluation of determining the number of unique resources, P can be tuned to accommodate a tradeoff between accuracy and storage space conservation. Where an earlier configured P had been used to generate arrays corresponding to sets of resources, the value of P can be later reduced (e.g., to accommodate a user input to reduce storage space used to store the arrays and/or speed up the speed at which the number of uniques is to be determined) to trigger a process of down conversion, such as the one described in process 900.

At 902, a reduced P is received, wherein the reduced P is smaller than a previous P. The "previous P" (P_previous) represents the P value that was used to generate stored arrays of length $2^{P\_previous}$ and "reduced P" (P reduced) represents the P value that is to be used to down convert the $2^{P\_previous}$ into length $2^{P\_reduced}$ and where P_previous>P_reduced.

At 904, a (next) affected array associated with a corresponding set of resources is determined. Any previously generated $2^{P\_previous}$ array can be thought of as an array that is affected by the down conversion.

At 906, respective bucket IDs of buckets of the affected array are modified based on a number of reduced bits between the reduced P and the previous P. The binary representation of each bucket ID of each bucket of the $2^{P\_previous}$ array is modified by removing as many bits starting from the most significant bit as P_reduced is smaller than P_previous to result in a short binary value that is then considered to be the modified bucket ID. For example, if P_previous is 7 and P_reduced is 5, then a bucket ID of "0100010" (34 in decimal) would be modified to be "00010" (2 in decimal).

At 908, the buckets of the affected array are mapped to new buckets of a reduced array based on the reduced respective bucket IDs. Returning to the previous example, if P_previous is 7 and P_reduced is 5, then a bucket ID of "0100010" (34 in decimal) would be modified to be "00010" (2 in decimal). As such, the packed integer that was stored at the bucket of the $2^{P\_previous}$ array associated with bucket ID "34" (in decimal) will be mapped to the bucket of the new reduced array (the $2^{P\_reduced}$ array) associated with bucket ID "2" (in decimal). Other modified bucket IDs of the $2^{P\_previous}$ array that are "34" (in decimal) will also map to the bucket of the new reduced array (the $2^{P\_reduced}$ array) associated with bucket ID "2" (in decimal).

At 910, for each bucket of the reduced array, a merged packed integer is determined based on packed integers of buckets of the affected array that have been mapped to that new bucket, if any. To merge the more than one packed integer from buckets of the $2^{P\_previous}$ array that map to a single bucket of the $2^{P\_reduced}$ array, the packed integers are compared to each other and the largest of the packed integers is stored in that bucket of the $2^{P\_reduced}$ array and the remaining packed integers are discarded. As described in process 900, to down convert a $2^{P\_previous}$ array associated with a set of resources into a shorter $2^{P\_reduced}$ array, the packed integers that are stored in the $2^{P\_previous}$ array are merged into the $2^{P\_reduced}$ array, without needing to retrieve or process the resource IDs associated with the set of resources again. After the down conversion process is completed, the $2^{P\_reduced}$ array will continue to represent the corresponding set of resources (in place of the $2^{P\_previous}$ array) in computations.

At 912, it is determined whether there is at least one more affected array to down convert. In the event that there is at least one more affected array (e.g., an array of size $2^{P\_previous}$), control is returned to 904 to start processing on the next affected array. Otherwise, in the event that there are no more affected arrays, process 900 ends.

Figure 10:
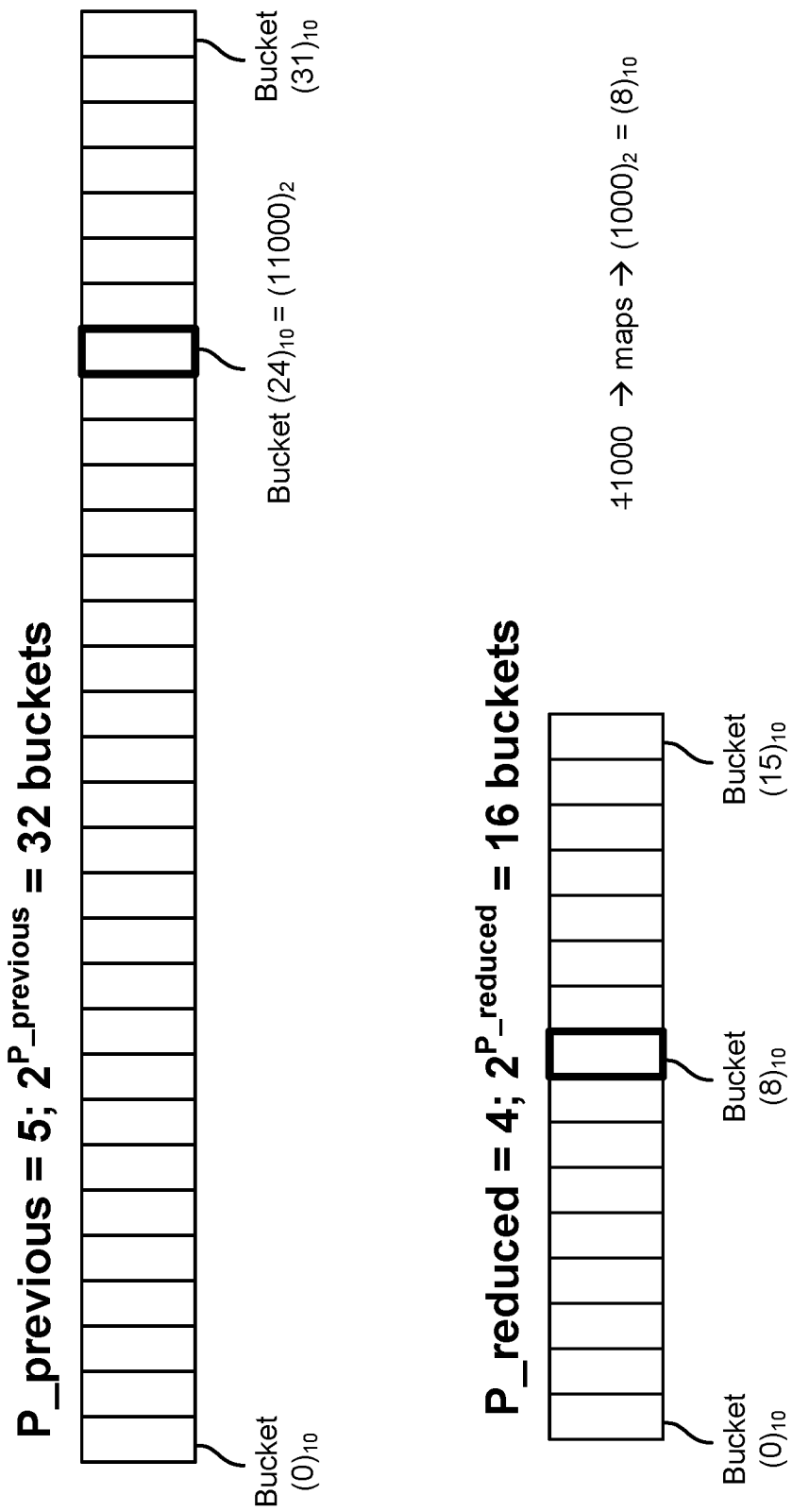
FIG. 10 shows an example of down converting an affected array to a new reduced array based on a reduced value of P.

FIG. 10 shows an example of down converting an affected array to a new reduced array based on a reduced value of P. The down conversion example of FIG. 10 can be performed using process 900 of FIG. 9. In the example of FIG. 10, at least one array was generated using P_previous=5 ($2^5$=32 buckets). Then, a new reduced value of P was received, which is referred to as P_reduced=4 ($2^4$=16). To down convert the affected $2^5$ array to the $2^4$ array, the binary representation of each bucket ID of the $2^5$ array is modified by removing the 1 bit that is the difference between P_previous (5) and P_reduced (4) starting with the most significant bit of the binary representation of each bucket ID in the $2^5$ array. As shown in FIG. 10, the binary representation ("1100") of bucket ID "24" (in decimal) of the $2^5$ array is modified to become ("100"), which is 8 in decimal. As such, the packed integer from bucket ID "24" of the $2^5$ array is mapped to bucket ID "8" of the $2^4$ array. While not shown in FIG. 10, the packed integer from bucket ID "24" of the $2^5$ array is then compared to other packed integer(s) that are mapped to bucket ID "8" of the $2^4$ array and the largest packed integer in the comparison is stored in bucket ID "8" of the $2^4$ array.

However, because the packed integers other than the largest one that is to be stored in the bucket to which they map in the reduced $2^4$ array are discarded, the reduced $2^4$ array cannot be used to expand back to the $2^5$ array or any other array with a larger value of P.

Figure 11:
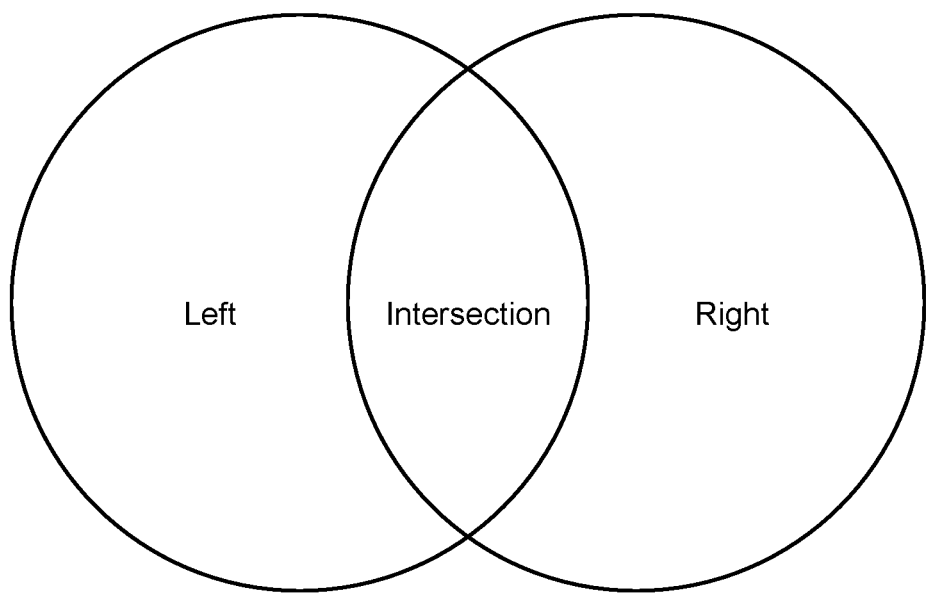
FIG. 11 is a diagram showing a Venn diagram that depicts the relationship between two sets of resources.

FIG. 11 is a diagram showing a Venn diagram that depicts the relationship between two sets of resources. The Venn diagram shown in FIG. 11 shows the "Left" set (that is depicted as the "Left" circle) and the "Right" set (that is depicted as the "Right" circle). Where the two sets overlap is referred to as the "Intersection." The relationships between two sets that are shown in FIG. 11 can be extended to three or more sets. The Venn diagram shown in FIG. 11 will be referred to by the set evaluation operations that will be described with FIGS. 12, 13, and 14, below.

Figure 12:
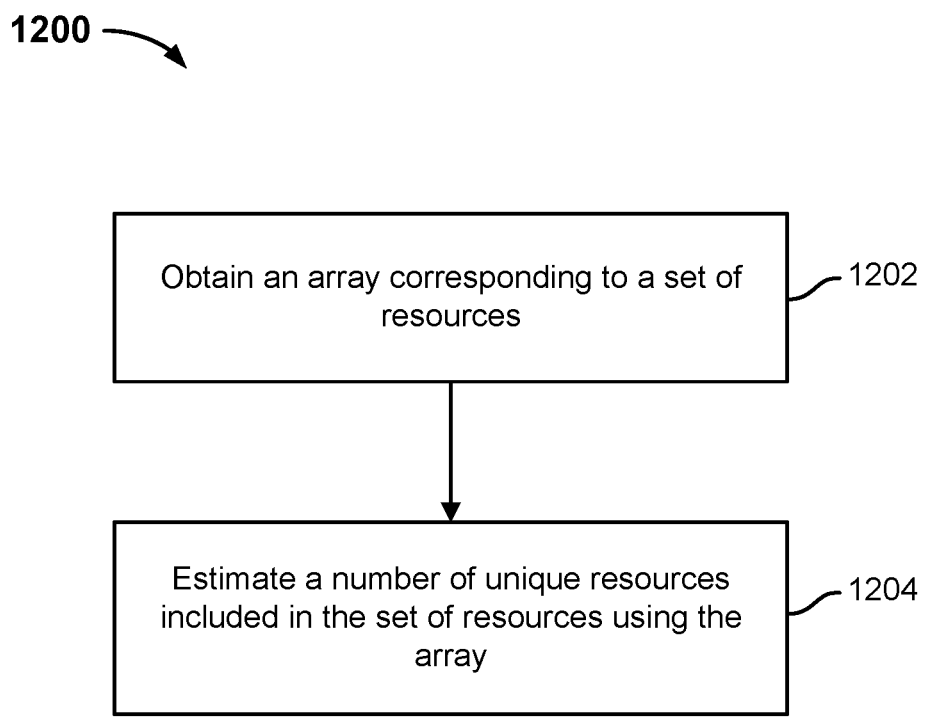
FIG. 12 is a flow diagram showing an example of a process for determining a cardinality associated with a set of resources using a given data structure generated based on the resource IDs associated with that set.

FIG. 12 is a flow diagram showing an example of a process for determining a cardinality associated with a set of resources using a given data structure generated based on the resource IDs associated with that set. In some embodiments, process 1200 can be implemented by sets evaluation server 108 of system 100 of FIG. 1.

At 1202, an array corresponding to a set of resources is obtained. The $2^P$ array corresponding to the set of resources may be generated using a process such as process 500 of FIG. 5.

At 1204, a number of unique resources included in the set of resources is estimated using the array. The number of unique resources (the number of resources with unique IDs) in the set can be determined by applying a formula to the $2^P$ array. In some embodiments, applying the Log Log-β formula to the $2^P$ array will yield an estimate of the number of unique resources in the set of resources. For example, the Log Log-β formula comprises the following formula:

$$\text{Cardinality} = \frac{\propto_m m(m-z)}{\beta(m,z) + \sum_{i=0}^{m-1} 2^{-M[i]}} \quad (1)$$

Where M is the array of size m=$2^P$, z is the number of buckets in M with the default value (e.g., 0), Cardinality is the estimated cardinality of the set of resources for which the resource IDs were processed into array M, $\propto_m$ is a precalculated coefficient that depends on the value of P used, and β(m,z) is a function of m and z. β(m,z) can be chosen in any proper manner such that formula (1) could yield accurate estimates for cardinalities. For example, the following is one example selection of β(m,z):

$$\beta(m,z) = -0.309142z + 13.731192z_l - 8.636985z_l^2 + 1.328973z_l^3,$$

Where $z_l$=log (z+1).

Referring back to the sets shown in FIG. 11, to find the number of unique resources within the "Left" set (the cardinality of the resources in the left circle), a formula such as, for example, Log Log-β formula, can be applied to the $2^P$ array that has been determined using the resource IDs associated with the resources in the "Left" set (e.g., using a process such as process 500 of FIG. 5). Similarly, to find the number of unique resources within the "Right" set (the cardinality of the resources in the right circle), a formula such as, for example, Log Log-β formula, can be applied to the $2^P$ array that has been determined using the resource IDs associated with the resources in the "Right" set (e.g., using a process such as process 500 of FIG. 5).

Figure 13:
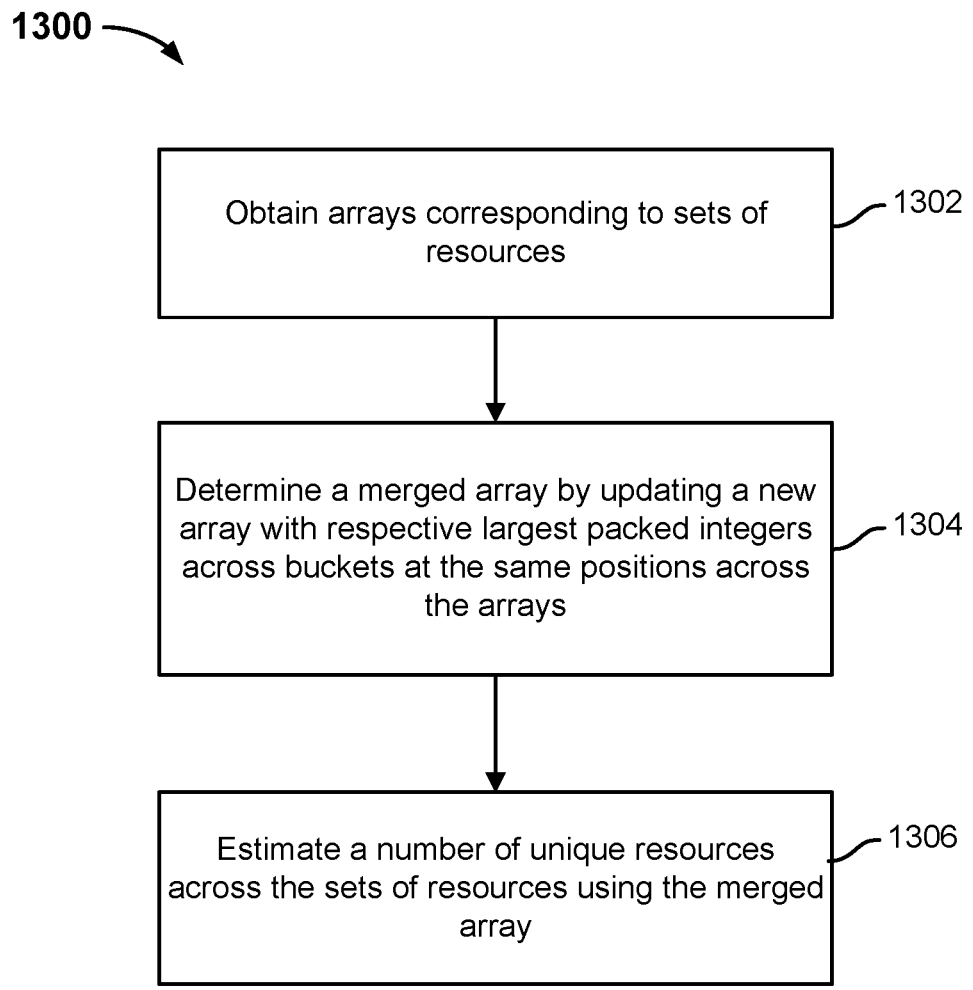
FIG. 13 is a flow diagram showing an example of a process for determining a union cardinality between sets of resources using respective data structures generated based on the resource IDs associated with those sets.

FIG. 13 is a flow diagram showing an example of a process for determining a union between sets of resources using respective data structures generated based on the resource IDs associated with those sets. In some embodiments, process 1300 can be implemented by sets evaluation server 108 of system 100 of FIG. 1. In some embodiments, step 310 of process 300 of FIG. 3 can be determined using process 1300.

At 1302, arrays corresponding to sets of resources are obtained. The respective $2^P$ array corresponding to each set of resources may be generated using a process such as process 500 of FIG. 5.

At 1304, a merged array is determined by updating a new array with respective largest packed integers across buckets at the same positions across the arrays. A merged array may be determined by merging together all the $2^P$ arrays. Specifically, the $2^P$ arrays may be merged together by comparing the packed integers within the same bucket position across all the $2^P$ arrays and storing in the bucket at that position in the new, merged array, the largest packed integer. Put another way, the merged $2^P$ array will store at each bucket the largest packed integer that was stored at that matching bucket from the $2^P$ arrays.

At 1306, a number of unique resources across the sets of resources is estimated using the merged array. The number of unique resources across (that are in any of) the sets of resources is estimated by applying a formula to the merged $2^P$ array. In some embodiments, applying the Log Log-β formula (as described above) to the $2^P$ merged array will yield an estimate of the union, the number of unique resources, across the set of resources. Put another way, the cardinality of the merged array is the union among the sets.

Referring back to the sets shown in FIG. 11, to find the union, the number of unique resources, across (that are in either) the "Left" set (the resources in the left circle) and the "Right" set (the resources in the right circle), the $2^P$ arrays that had been determined for the respective sets using the resource IDs associated with the resources in the sets (e.g., using a process such as process 500 of FIG. 5) are first merged into a merged $2^P$ array. In this example, the merged $2^P$ array includes for each bucket, the larger of the packed integer from each $2^P$ array associated with the "Left" set or the $2^P$ array associated with the "Right" set at the matching bucket. Then, to find the union between the "Left" and "Right" sets, a formula such as, for example, Log Log-β formula, can be applied to the merged $2^P$ array. Put another way, the union across the "Left" and "Right" sets can be expressed as the following:

Union=Cardinality(Merge(Left,Right))

Figure 14:
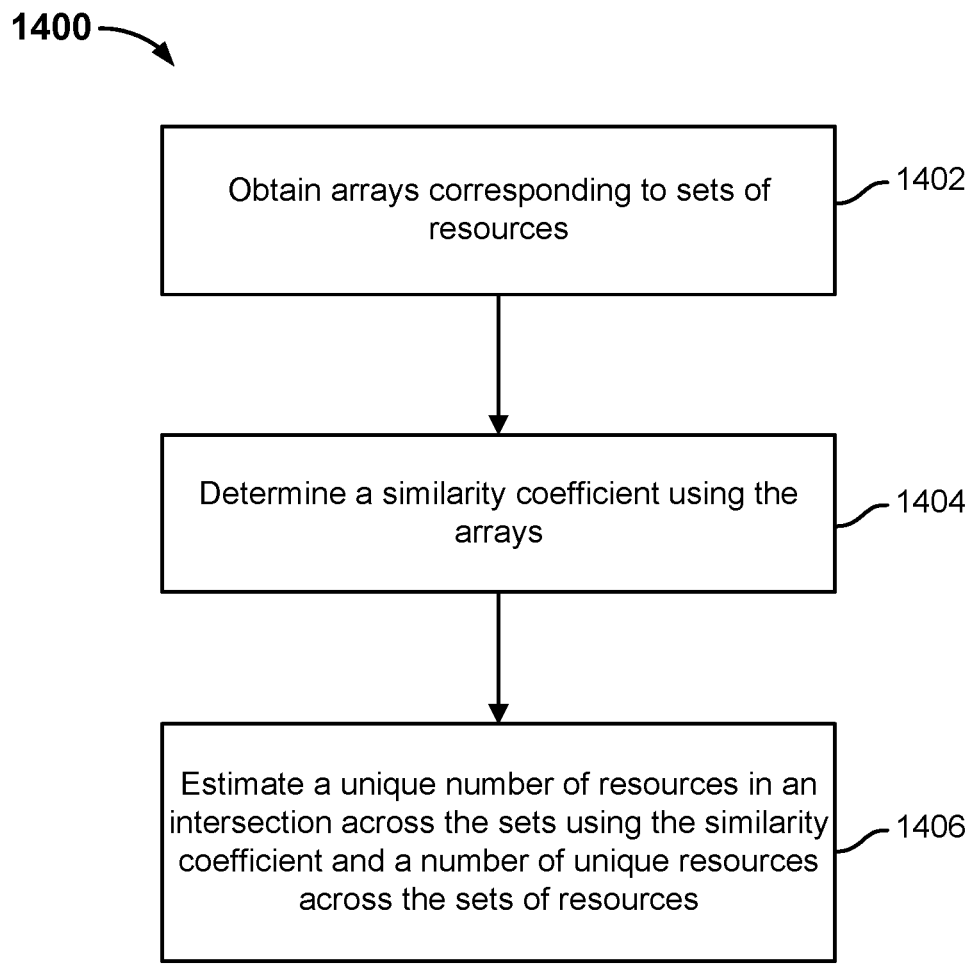
FIG. 14 is a flow diagram showing an example of a process for determining an intersection cardinality between sets of resources using respective data structures generated based on the resource IDs associated with those sets.

FIG. 14 is a flow diagram showing an example of a process for determining the cardinality of an intersection between sets of resources using respective data structures generated based on the resource IDs associated with those sets. In some embodiments, process 1400 can be implemented by sets evaluation server 108 of system 100 of FIG. 1. In some embodiments, step 310 of process 300 of FIG. 3 can be determined using process 1400.

At 1402, arrays corresponding to sets of resources are obtained. The respective $2^P$ array corresponding to each set of resources may be generated using a process such as process 500 of FIG. 5.

At 1404, a similarity coefficient is determined using the arrays. In some embodiments, a similarity coefficient between the $2^P$ arrays can be determined by comparing the packed integers stored in matching buckets across the $2^P$ arrays. In one example, the Jaccard index across the $2^P$ arrays is the similarity coefficient. The Jaccard index can be determined as the number of matching buckets across the $2^P$ arrays over the total number of initialized buckets (initialized buckets are those that store a packed integer and not a default value) with a $2^P$ array. Put another way, the denominator of the Jaccard index is the union of the initialized buckets across the arrays. For example, given two arrays, where the first array has buckets 0-30 initialized and the second array has buckets 20-40 initialized, there are in total 41 initialized buckets across their union. The similarity coefficient is a value in the range of [0,1].

At 1406, a unique number of resources in an intersection across the sets is estimated using the similarity coefficient and a number of unique resources across the sets of resources. The intersection cardinality of the sets of resources (the number of unique resources that are in all of the sets of resources) is determined as a function of the similarity coefficient and the union cardinality (the number of unique resources that are in any of the sets of resources) of the sets of resources. The union of the sets of resources can be determined using a process such as process 1300 of FIG. 13. For example, the intersection cardinality of the sets of resources (the number of unique resources that are in all of the sets of resources) is determined as a product between the similarity coefficient and the union (the number of unique resources that are in any of the sets of resources) of the sets of resources.

Referring back to the sets shown in FIG. 11, to find the intersection cardinality (the overlap between the left circle and the right circle), the number of unique resources, between (that are in both) the "Left" set (the resources in the left circle) and the "Right" set (the resources in the right circle), a similarity coefficient (e.g., the Jaccard index) is determined between the $2^P$ arrays that had been determined for the respective sets using the resource IDs associated with the resources in the sets (e.g., using a process such as process 500 of FIG. 5). The union between the "Left" set and the "Right" set are also determined (e.g., using a process such as process 1300 of FIG. 13). Then, the intersection cardinality is determined as a product between the similarity coefficient and the union. Put another way, the intersection cardinality between the "Left" and "Right" sets can be expressed as the following:

Intersection=Jaccard(Left,Right)×Cardinality(Merge(Left,Right))

As described herein, resource IDs associated with sets of resources can be efficiently stored in lightweight data structures (e.g., $2^P$ arrays), which can then be used to compute cardinality associated with a single set of resources or a derived value (e.g., a union cardinality or an intersection cardinality) among two or more sets of resources. Furthermore, previously generated data structures can be reduced (down converted) in size (e.g., in response to a reduced P value) to speed up the set evaluation computations without needing to re-process the resource IDs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor configured to:
        determine a first plurality of representations from identifying information associated with a first set of resources;
        update a first data structure corresponding to the first set of resources using portions of respective ones of the first plurality of representations, wherein the first data structure initially stores default values in a plurality of buckets, wherein to update the first data structure corresponding to the first set of resources comprises to:
            map the portions of respective ones of the first plurality of representations to at least a subset of the plurality of buckets; and
            replace at least some of the default values in the at least subset of the plurality of buckets with the portions of respective ones of the first plurality of representations, including to:
                determine that a representation of the first plurality of representations maps to a bucket in the plurality of buckets;
                compare the representation to a current value stored in the bucket; and
                in response to the comparison, replace the current value stored in the bucket by storing a respective portion of the representation in the bucket;
        determine a second plurality of representations from identifying information associated with a second set of resources;
        update a second data structure corresponding to the second set of resources using portions of respective ones of the second plurality of representations; and
        use the first data structure and the second data structure to compute a derived value associated with the first set of resources and the second set of resources; and
    a memory coupled to the processor and configured to provide the processor with instructions.

2. The system of claim 1, wherein the first plurality of representations comprises a first plurality of hash values.

3. The system of claim 1, wherein the processor is further configured to select the portions of respective ones of the first plurality of representations based at least in part on positions associated with bits within each representation.

4. The system of claim 3, wherein a selected portion of a representation cannot be used to recover the representation.

5. The system of claim 1,
    wherein to map the portions of respective ones of the first plurality of representations to the at least subset of the plurality of buckets comprises to: map the representation of the first plurality of representations to the bucket in the first data structure using a first portion of the representation; and
    wherein the respective portion of the representation comprises a combination of a second portion and a third portion of the representation.

6. The system of claim 5, wherein the second portion of the representation is selected as a region within the representation as a function of P, and wherein P is associated with a size of the first data structure.

7. The system of claim 1, wherein the processor is further configured to:
    receive a user input to reduce a first size of the first data structure;

map the plurality of buckets of the first data structure to a new data structure associated with a second size, wherein the second size is smaller than the first size; and update the new data structure based at least in part on current values of the plurality of buckets of the first data structure using the mapping.

8. The system of claim 7, wherein to update the new data structure comprises to:

determine that a set of current values from corresponding buckets in the first data structure maps to a bucket of the new data structure; and store a largest current value of the set of current values into the bucket of the new data structure.

9. The system of claim 1, wherein to use the first data structure and the second data structure to compute the derived value comprises to determine a union cardinality associated with the first set of resources and the second set of resources, including to:

determine a merged data structure by updating a new data structure with respective largest stored values across buckets at the same positions across the first data structure and the second data structure; and determine the union cardinality associated with the first set of resources and the second set of resources based at least in part on determining a cardinality using the merged data structure.

10. The system of claim 1, wherein to use the first data structure and the second data structure to compute the derived value comprises to determine an intersection cardinality associated with the first set of resources and the second set of resources, including to:

determine a similarity coefficient using the first data structure and the second data structure; and determine the intersection cardinality associated with the first set of resources and the second set of resources based at least in part on the similarity coefficient and a union cardinality associated with the first set of resources and the second set of resources.

11. The system of claim 10, wherein the similarity coefficient comprises the Jaccard index.

12. A method, comprising:

determining a first plurality of representations from identifying information associated with a first set of resources;

updating a first data structure corresponding to the first set of resources using portions of respective ones of the first plurality of representations, wherein the first data structure initially stores default values in a plurality of buckets, wherein updating the first data structure corresponding to the first set of resources comprises:

mapping the portions of respective ones of the first plurality of representations to at least a subset of the plurality of buckets; and replacing at least some of the default values in the at least subset of the plurality of buckets with the portions of respective ones of the first plurality of representations, including:

determining that a representation of the first plurality of representations maps to a bucket in the plurality of buckets;

comparing the representation to a current value stored in the bucket; and in response to the comparison, replacing the current value stored in the bucket by storing a respective portion of the representation in the bucket;

determining a second plurality of representations from identifying information associated with a second set of resources;

updating a second data structure corresponding to the second set of resources using portions of respective ones of the second plurality of representations; and using the first data structure and the second data structure to compute a derived value associated with the first set of resources and the second set of resources.

13. The method of claim 12, further comprising selecting the portions of respective ones of the first plurality of representations based at least in part on positions associated with bits within each representation.

14. The method of claim 13, wherein a selected portion of a representation cannot be used to recover the representation.

15. The method of claim 12, wherein mapping the portions of respective ones of the first plurality of representations to the at least subset of the plurality of buckets comprises: mapping the representation of the first plurality of representations to the bucket in the first data structure using a first portion of the representation; and wherein the respective portion of the representation comprises a combination of a second portion and a third portion of the representation.

16. The method of claim 12, further comprising:

receiving a user input to reduce a first size of the first data structure;

mapping the plurality of buckets of the first data structure to a new data structure associated with a second size, wherein the second size is smaller than the first size; and updating the new data structure based at least in part on current values of the plurality of buckets of the first data structure using the mapping.

17. The method of claim 16, wherein updating the new data structure comprises:

determining that a set of current values from corresponding buckets in the first data structure maps to a bucket of the new data structure; and storing a largest current value of the set of current values into the bucket of the new data structure.

18. The method of claim 12, wherein using the first data structure and the second data structure to compute the derived value comprises to determine a union cardinality associated with the first set of resources and the second set of resources, including:

determining a merged data structure by updating a new data structure with respective largest stored values across buckets at the same positions across the first data structure and the second data structure; and determining the union cardinality associated with the first set of resources and the second set of resources based at least in part on determining a cardinality using the merged data structure.

19. The method of claim 12, wherein using the first data structure and the second data structure to compute the derived value comprises to determine an intersection cardinality associated with the first set of resources and the second set of resources, including:

determining a similarity coefficient using the first data structure and the second data structure; and determining the intersection cardinality associated with the first set of resources and the second set of resources based at least in part on the similarity coefficient and a union cardinality associated with the first set of resources and the second set of resources.

20. A computer program product, the computer program product being embodied in a non-transitory computer readable storage medium and comprising computer instructions for:

determining a first plurality of representations from identifying information associated with a first set of resources;

updating a first data structure corresponding to the first set of resources using portions of respective ones of the first plurality of representations, wherein the first data structure initially stores default values in a plurality of buckets, wherein updating the first data structure corresponding to the first set of resources comprises:

mapping the portions of respective ones of the first plurality of representations to at least a subset of the plurality of buckets; and replacing at least some of the default values in the at least subset of the plurality of buckets with the portions of respective ones of the first plurality of representations, including:

determining that a representation of the first plurality of representations maps to a bucket in the plurality of buckets;

comparing the representation to a current value stored in the bucket; and in response to the comparison, replacing the current value stored in the bucket by storing a respective portion of the representation in the bucket;

determining a second plurality of representations from identifying information associated with a second set of resources;

updating a second data structure corresponding to the second set of resources using portions of respective ones of the second plurality of representations; and using the first data structure and the second data structure to compute a derived value associated with the first set of resources and the second set of resources.

* * * * *